(12) United States Patent
Chang et al.

(10) Patent No.: US 6,337,770 B1
(45) Date of Patent: Jan. 8, 2002

(54) SINGLE-PASS FOLDED INTERLEAVER/DEINTERLEAVERS

(75) Inventors: Kok-Wai Chang, Sunnyvale; Kuochou Tai, Fremont, both of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/476,609

(22) Filed: Dec. 31, 1999

(51) Int. Cl.$^7$ .............................. G02B 5/30; H04J 14/02
(52) U.S. Cl. ..................... 359/495; 359/497; 359/117; 359/122; 359/124
(58) Field of Search ................. 359/115, 117, 359/122, 124, 484, 487, 495, 497

(56) References Cited

U.S. PATENT DOCUMENTS

| | | | |
|---|---|---|---|
| 4,464,022 A | | 8/1984 | Emkey |
| 4,474,434 A | | 10/1984 | Carlsen et al. |
| 4,474,435 A | | 10/1984 | Carlsen et al. |
| 4,514,046 A | | 4/1985 | Carlsen et al. |
| 4,566,761 A | | 1/1986 | Carlsen et al. |
| 4,685,773 A | | 8/1987 | Carlsen et al. |
| 5,204,771 A | | 4/1993 | Koga |
| 5,299,056 A | * | 3/1994 | Kurata et al. |
| 5,319,483 A | * | 6/1994 | Krasinski et al. |
| 5,381,250 A | * | 1/1995 | Meadows ................. 359/495 |
| 5,471,340 A | | 11/1995 | Cheng et al. |
| 5,488,500 A | | 1/1996 | Glance |
| 5,493,440 A | * | 2/1996 | Souda et al. |
| 5,499,132 A | * | 3/1996 | Tojo et al. ................. 359/484 |
| 5,546,219 A | * | 8/1996 | Iida ............................ 359/495 |
| 5,611,004 A | | 3/1997 | Chang et al. |
| 5,689,360 A | * | 11/1997 | Kurata et al. ............. 359/484 |
| 5,689,593 A | * | 11/1997 | Pan et al. ................... 359/497 |
| 5,694,233 A | | 12/1997 | Wu et al. |
| 5,712,717 A | | 1/1998 | Hamel et al. |
| 5,724,165 A | * | 3/1998 | Wu ............................. 359/117 |
| 5,737,104 A | | 4/1998 | Lee et al. |
| 5,764,825 A | | 6/1998 | Mugino et al. |

(List continued on next page.)

OTHER PUBLICATIONS

Yariv & Yeh, "Jones Calculus and its Application to Birefringent Optical Systems", Optical Waves in Crystals, 1984, pp. 120–154, John Wiley & Sons, Canada.

E. O. Ammann, "Synthesis of Electro–Optic Shutters having a Prescribed Transmission vs Voltage Characteristic", Journal of the Optical Society of America, Aug. 1996. pp. 1081–1088, vol. 56, No. 8, USA.

S.E. Harris, E. O. Ammann & I.C. Chang, "Optical Network Synthesis Using Birefringent Crystals", Journal of the Optical Society of America, Oct. 1964, pp. 1267–1279, vol. 54, No. 10, USA.

(List continued on next page.)

Primary Examiner—Ricky D. Shafer
(74) Attorney, Agent, or Firm—Randy W. Lacasse; Kevin E. Greene; Lacasse & Associates

(57) ABSTRACT

Interleaver/deinterleaver apparatuses for combining/separating optical channels are described. An interleaver/deinterleaver apparatus is described as folded when an optical signal is directed through a single crystal multiple times. Single-pass refers to the optical signal following a (folded) path through the apparatus a single time. When operating as an deinterleaver, the interleaver/deinterleaver separates an optical signal (e.g., WDM signal) into subsets of optical signals (e.g., channels). When operating as an interleaver, the interleaver/deinterleaver mixes subsets of optical signals (e.g., channels) into a multiplexed (e.g., WDM) optical signal. The interleaver/deinterleaver apparatus can be used to increase the bandwidth of an optical network. For example, the interleaver/deinterleaver can be used to interface components designed for a first channel spacing (e.g., 100 GHz) to components designed for a second channel spacing (e.g., 200 GHz).

29 Claims, 14 Drawing Sheets

U.S. PATENT DOCUMENTS

| | | | | |
|---|---|---|---|---|
| 5,768,005 A | * | 6/1998 | Cheng et al. | 359/484 |
| 5,778,118 A | | 7/1998 | Sridhar | |
| 5,808,763 A | | 9/1998 | Duck et al. | |
| 5,822,095 A | | 10/1998 | Taga et al. | |
| 5,835,517 A | | 11/1998 | Jayaraman et al. | |
| 5,852,505 A | | 12/1998 | Li | |
| 5,867,291 A | * | 2/1999 | Wu et al. | 359/124 |
| 5,878,176 A | * | 3/1999 | Cheng | |
| 5,915,051 A | | 6/1999 | Damask et al. | |
| 5,926,587 A | | 7/1999 | Chen et al. | |
| 5,930,039 A | | 7/1999 | Li et al. | |
| 5,974,205 A | | 10/1999 | Chang | |
| 5,999,313 A | * | 12/1999 | Fukushima | 359/484 |
| 6,002,503 A | | 12/1999 | Mizrahi | |
| 6,061,484 A | | 5/2000 | Jones et al. | |
| 6,075,647 A | * | 6/2000 | Braun et al. | 359/484 |

OTHER PUBLICATIONS

Benjamin B. Dingel & Masayuki Izutsu, "Multifunction Optical Filter with a Michelson–Gires–Tournois Interferometer for Wavelength–Division–Multiplexed Network System Applications", Optics Letters: Jul. 15, 1998; pp. 1099–1101, vol. 23, No. 14, Optical Society of America, USA.

Benjamin B, Dingel & Tadashi Aruga, "Properties of a Novel Noncascaded Type, Easy–to–Design, Ripple–Free Optical Bandpass Filter", Journal of Lightwave Technology, Aug. 1999, pp. 1461–1469, vol. 17, No. 8, USA.

Shaoping Bian, Kebin Xu, & Jing Hong, "Optical Perfect Shuffle Using Wollaston Prisms", Applied Optics, Jan. 10, 1991; pp. 173–174, vol. 30, No. 2, USA.

Jack L. Jewell, S.L. McCall, Y.H. Lee, A. Scherer, A.C. Gossard, & J.H. English, "Optical Computing and Related Microoptic Devices", Applied Optics, Dec. 1, 1990, pp. 5050–5053, vol. 29, No. 34, USA.

Miles Murdocca, "Connection Routing for Microoptic Systems", Applied Optics, Mar. 10, 1990, pp. 1106–1110, vol. 29, No. 8, USA.

Kazuhiro Noguchi, Toshikazu Sakano, & Takao Matsumoto, "A Rearrangeable Multichannel Free–Space Optical Switch Based on Multistage Network Configuration", Journal of Lightwave Technology, Dec. 1991, pp. 1726–1732, vol. 9, No. 12, USA.

K. Shiraishi, T. Sato & S. Kawakami, "Experimental Verification of a Form–Birefringent Polarization Splitter", Applied Physics Letters, Jan. 21, 1991, pp. 211–212, vol. 58, No. 3, USA.

Masataka Shirasaki & Kunihiko Asama, "Compact Optical Isolator for Fibers Using Birefringent Wedges", Applied Optics, Dec. 1, 1982, pp. 4296–4299, vol. 21, No. 23, USA.

* cited by examiner

SINGLE-PASS FOLDED INTERLEAVER/DEINTERLEAVERS

FIELD OF THE INVENTION

The invention relates to optical devices. More particularly, the invention relates to an interleaver/deinterleaver having a folded design such that an optical signal passes through a single crystal multiple times.

BACKGROUND OF THE INVENTION

As telecommunications usage increases as a result of, for example, increased Internet usage, increased types of communications, population growth, telecommunications providers are required to provide greater voice- and data-carrying capacity. In order to reduce cost and the amount of time required to provide the increased capacity wavelength division multiplexing (WDM) and dense wavelength division multiplexing (DWDM) have been developed, which provide increased capacity without requiring new fiber optic cables.

WDM and DWDM technologies combine multiple optical signals into a single fiber by transporting different signals on a different optical wavelengths or channels. Interleaving and deinterleaving of optical channels is typically accomplished with thin film optical filters. However, multiple layers of film are required to interleave and deinterleave multiple channels, which increases the cost and complexity of a component. Another disadvantage of multiple layers of thin film for filtering is that the thin films break down over time, especially when operating under high power conditions.

What is needed is an improved optical device for use with WDM and/or DWDM optical signals. Prior attempts to improve optical devices are disclosed in U.S. Pat. No. 4,566,761 issued Jan. 28, 1986 to Carlsen et al, 4,685,773 issued Aug. 11, 1987 to Carlsen et al, and 5,694,233 issued Dec. 2, 1997 to Wu et al, which are incorporated herein by reference.

SUMMARY OF THE INVENTION

Single-pass folded interleaver/deinterleavers are described. The device includes a birefringent assembly and multiple reflective elements. The reflective elements reflect an optical signal received via an input port such that the optical signal makes multiple passes through the birefringent assembly before being directed to a first output port and a second output port. The multiple reflections through the birefringent assembly cause a set of signals included in the optical signal received via the input port to be separated into a first subset of optical signals and a second subset of optical signals, which are directed to a first output port and a second output port, respectively.

In one embodiment, set of half wave plates are positioned between one or more of the reflective elements and the birefringent crystal. The half wave plates are oriented with azimuth angles such that the first subset of optical signals have a first polarization and the second subset of optical signals have a second polarization. In one embodiment, the first and second subset of optical signals includes even and odd International Telecommunications Union (ITU) channels.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Single-pass folded interleaver/deinterleavers are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Interleaver/deinterleaver apparatuses for combining/separating optical channels are described. An interleaver/deinterleaver apparatus is described as folded when an optical signal is directed through a single crystal multiple times. Single-pass refers to the optical signal following a (folded) path through the apparatus a single time. When operating as an deinterleaver, the interleaver/deinterleaver separates an optical signal (e.g., WDM signal) into subsets of optical signals (e.g., channels). In one embodiment, deinterleaving optical signals separates an optical signal into even and odd International Telecommunications Union (ITU) channels.

When operating as an interleaver, the interleaver/deinterleaver mixes subsets of optical signals (e.g., channels) into a multiplexed (e.g., WDM) optical signal. The interleaver/deinterleaver apparatus can be used to increase the bandwidth of an optical network. For example, the interleaver/deinterleaver can be used to interface components designed for a first channel spacing (e.g., 100 GHz) to components designed for a second channel spacing (e.g., 200 GHz). In one embodiment, interleaving combines even and odd ITU channels into a single optical signal.

Figure 1:
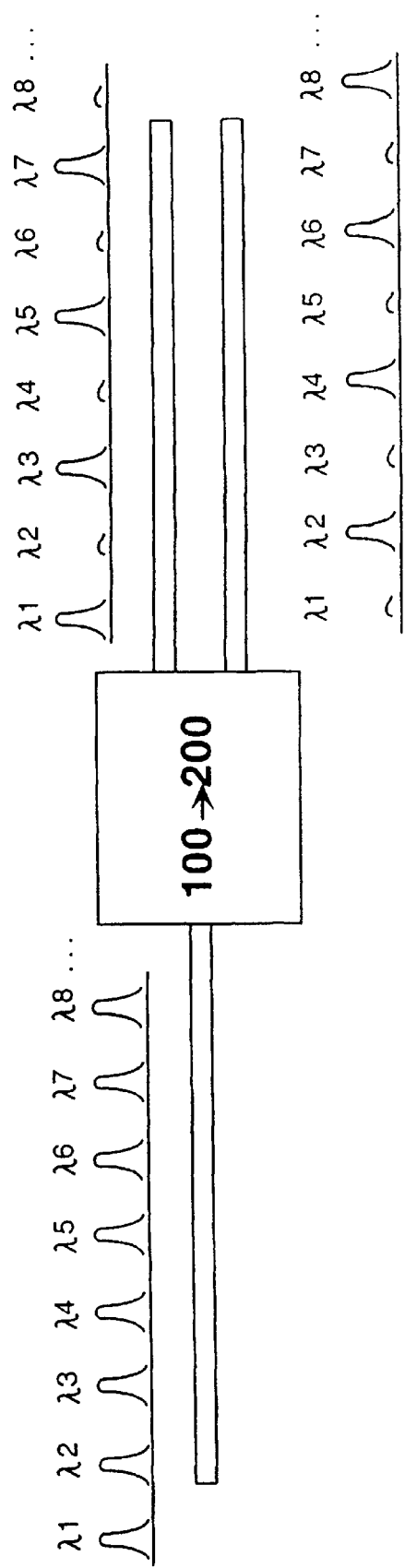
FIG. 1 is a conceptual illustration of a conversion from an optical channel scheme having 100 GHz spacing to an optical channel scheme having 200 GHz.

FIG. 1 is a conceptual illustration of a conversion from an optical channel scheme having 100 GHz spacing to an optical channel scheme having 200 GHz. The conversion of FIG. 1 is useful, for example, to allow devices designed to operate with an optical channel scheme having 200 GHz channel spacing to interact with other devices or a network designed to operate with an optical channel scheme having 100 GHz channel spacing. Conversion between 100 GHz channel spacing and 200 GHz channel spacing allows, for example, network bandwidth to be increased without upgrading all of the devices that interact with the network.

In one embodiment, the converter of FIG. 1 is a deinterleaver that separates an optical signal having even and odd channels (e.g., ITU channels) into a first optical signal including the even channels and a second optical signal including the odd signals. After the signals are deinterleaved, the odd channels have a 200 GHz spacing and the even channels have a 200 GHz spacing. Recombining the even and the odd channels can be accomplished with an interleaver that combines the odd channels and the even channels into a single optical signal. In other words, the even and odd channels having 200 GHz spacing are combined (interleaved) into an optical signal having 100 GHz signal spacing. Similar interleaving can be provided to convert between 50 GHz spaced channels and 100 GHz spaced channels, as well as between other sets of channel spacing schemes.

Figure 2:
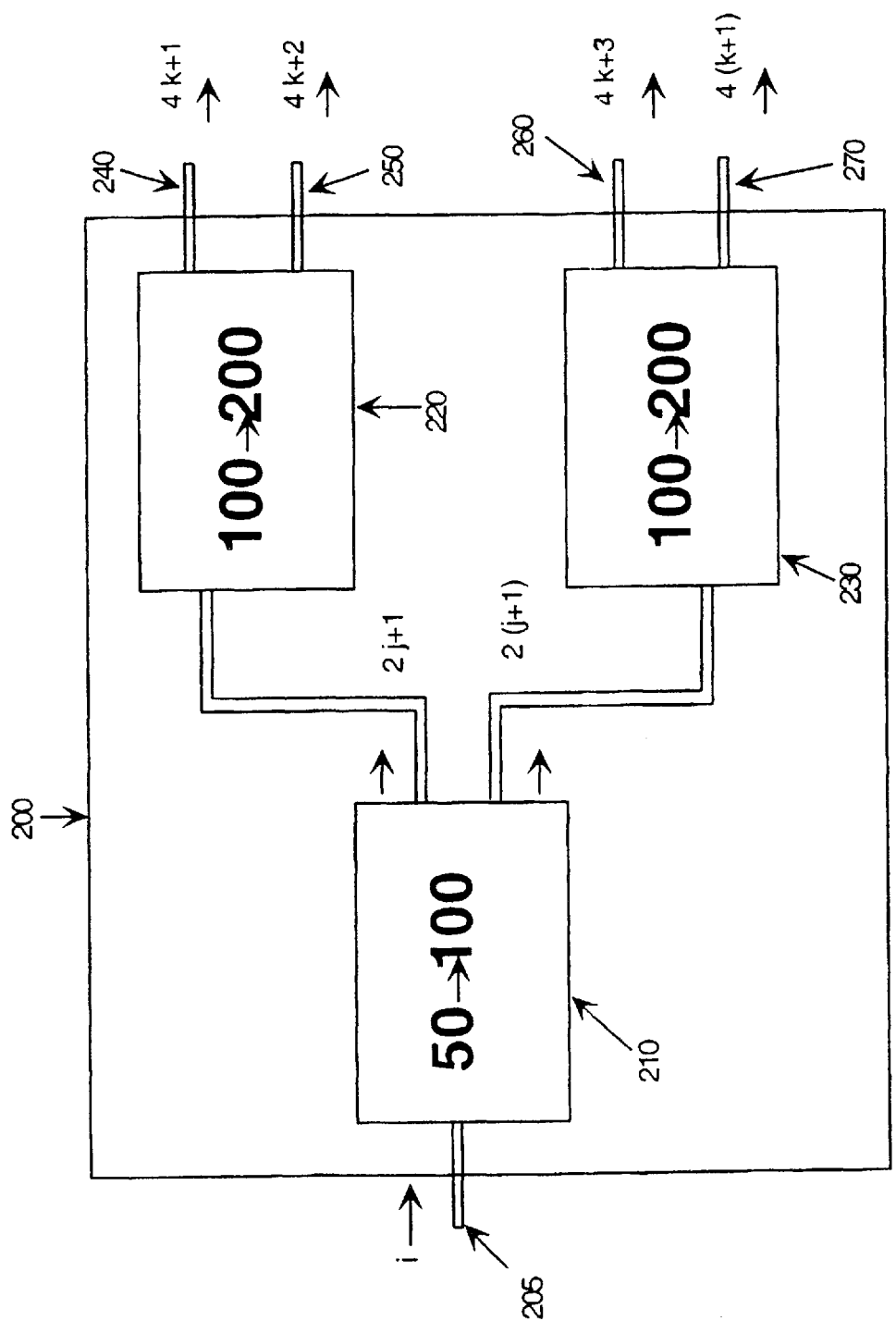
FIG. 2 is a block diagram of an optical deinterleaver for conversion from an optical channel scheme having 50 GHz spacing to an optical channel scheme having 200 GHz spacing.

FIG. 2 is a block diagram of an optical deinterleaver for conversion from an optical channel scheme having 50 GHz spacing to an optical channel scheme having 200 GHz spacing. In general, deinterleaver 200 includes deinterleaver 210 to convert from one set of 50 GHz spaced channels to two sets of 100 GHz spaced channels. Deinterleaver 200 also includes two deinterleavers (220 and 230) each of which convert one of the sets of 100 GHz spaced channels to two sets of 200 GHz spaced channels. Deinterleaver 200 allows devices designed for 200 GHz spaced channels to interact with devices or networks designed for 50 GHz spaced channels.

Optical fiber 205 carries a set of optical channels, i, having 50 GHz spacing. Deinterleaver 210 separates the set of optical channels into sets of even, 2(j+1), and odd, 2j+1, channels. The even channels are input to deinterleaver 230 and the odd channels are input deinterleaver 220. The even and the odd channels have 100 GHz spacing.

Deinterleavers 220 and 230 operate to further separate the set of optical channels. Conceptually, deinterleaver 220 and 230 operate on the respective 100 GHz spaced channels to separate the input channels into "even" and "odd" channels. The sets of channels output by deinterleavers 220 and 230 have 200 GHz spacing.

Deinterleaver 220 separates the odd channels into two sets of channels, odd-odd channels, 4k+1, output by optical fiber 240 and odd-even, 4k+2, channels output by optical fiber 250. Deinterleaver 230 separates the even channels into two sets of channels, the even-odd, 4k+3, channels output by optical fiber 260 and the even-even, 4(k+1), channels output by optical fiber 270.

The four sets of channels output by deinterleaver 200 are 200 GHz spaced channels. Thus, deinterleaver 200 can be used to interface one or more devices designed to operate on 200 GHz spaced channels with one or more devices or networks designed to operate on 50 GHz spaced channels. Other channel spacings can also be supported.

Figure 3:
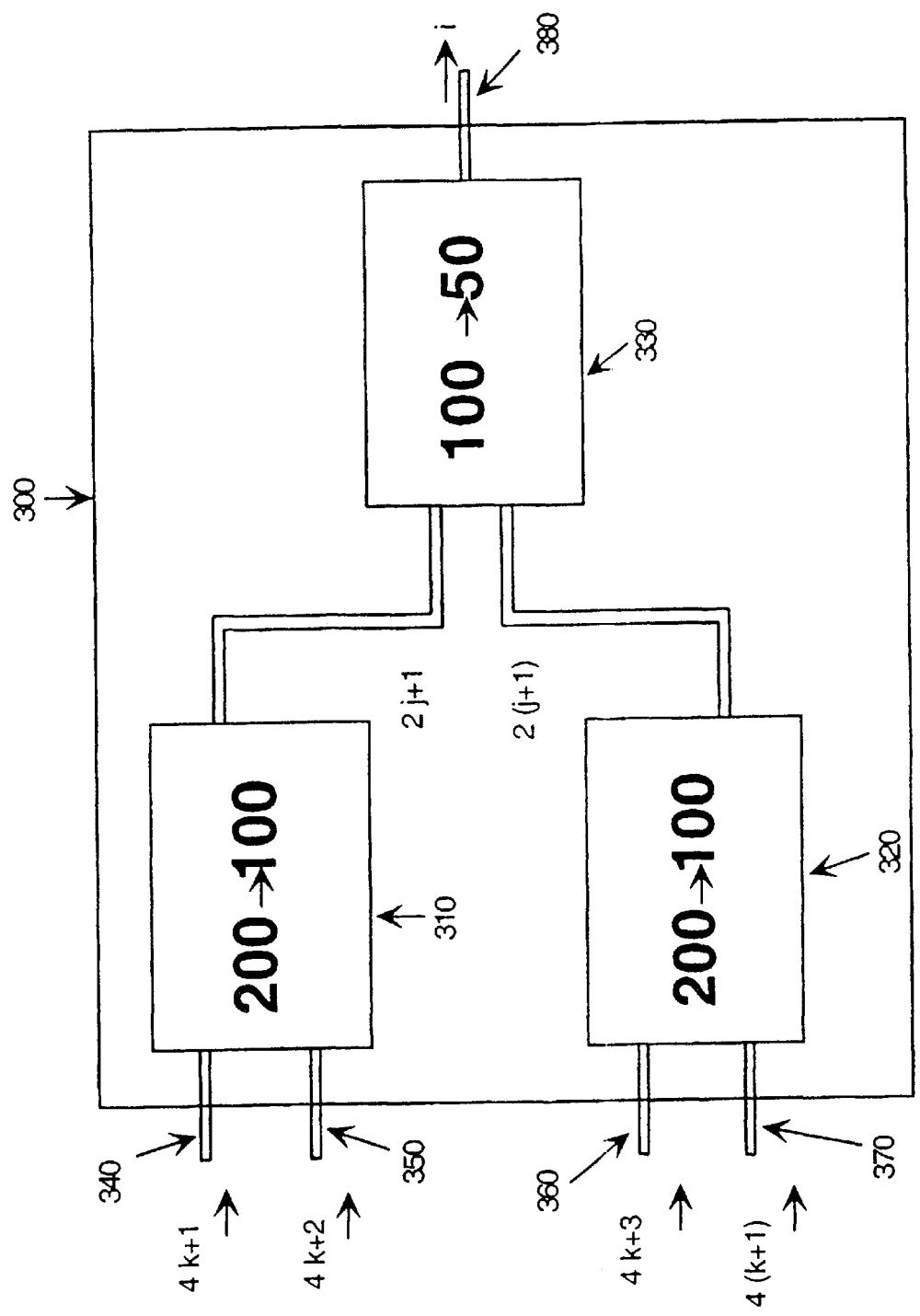
FIG. 3 is a block diagram of an optical interleaver for conversion from an optical channel scheme having 200 GHz spacing to an optical channel scheme having 50 GHz spacing.

FIG. 3 is a block diagram of an optical interleaver for conversion from an optical channel scheme having 200 GHz spacing to an optical channel scheme having 50 GHz spacing. In general, interleaver 300 includes interleaver 310 to convert from two sets of 200 GHz spaced channels to one set of 100 GHz spaced channels. Similarly, interleaver 320 converts from two sets of 200 GHz spaced channels to one set of 100 GHz channels. Interleaver 330 converts the two sets of 100 GHz spaced channels to one set of 50 GHz spaced channels. Interleaver 300 allows devices designed for 200 GHz spaced channels to interact with devices or networks designed for 50 GHz spaced channels.

The odd-odd, 4k+1, channels having 200 GHz spacing are input to interleaver 310 via optical fiber 340. The odd-even, 4k+2, channels having 200 GHz spacing are input to interleaver 310 via optical fiber 350. Interleaver 310 interleaves the odd-odd channels and the odd-even channels to generate a set of odd, 2j+1, channels having 100 GHz spacing.

The even-odd, 4k+3, channels having 200 GHz spacing are input to interleaver 320 via optical fiber 360. The even-even, 4(k+1), channels having 200 GHz spacing are input to interleaver 320 via optical fiber 370. Interleaver 320 interleaves the even-odd channels and the even-even channels to generate a set of even, 2(j+1), channels having 100 GHz spacing.

Interleaver 330 interleaves the even and odd channels to generate a set of channels, i, having 50 GHz spacing. Thus, interleaver 300 allows devices designed to operate on optical channels having 200 GHz spacing to interact with devices designed to operate on optical channels having 50 GHz spacing. Other channels spacings can also be supported.

Figure 4A:
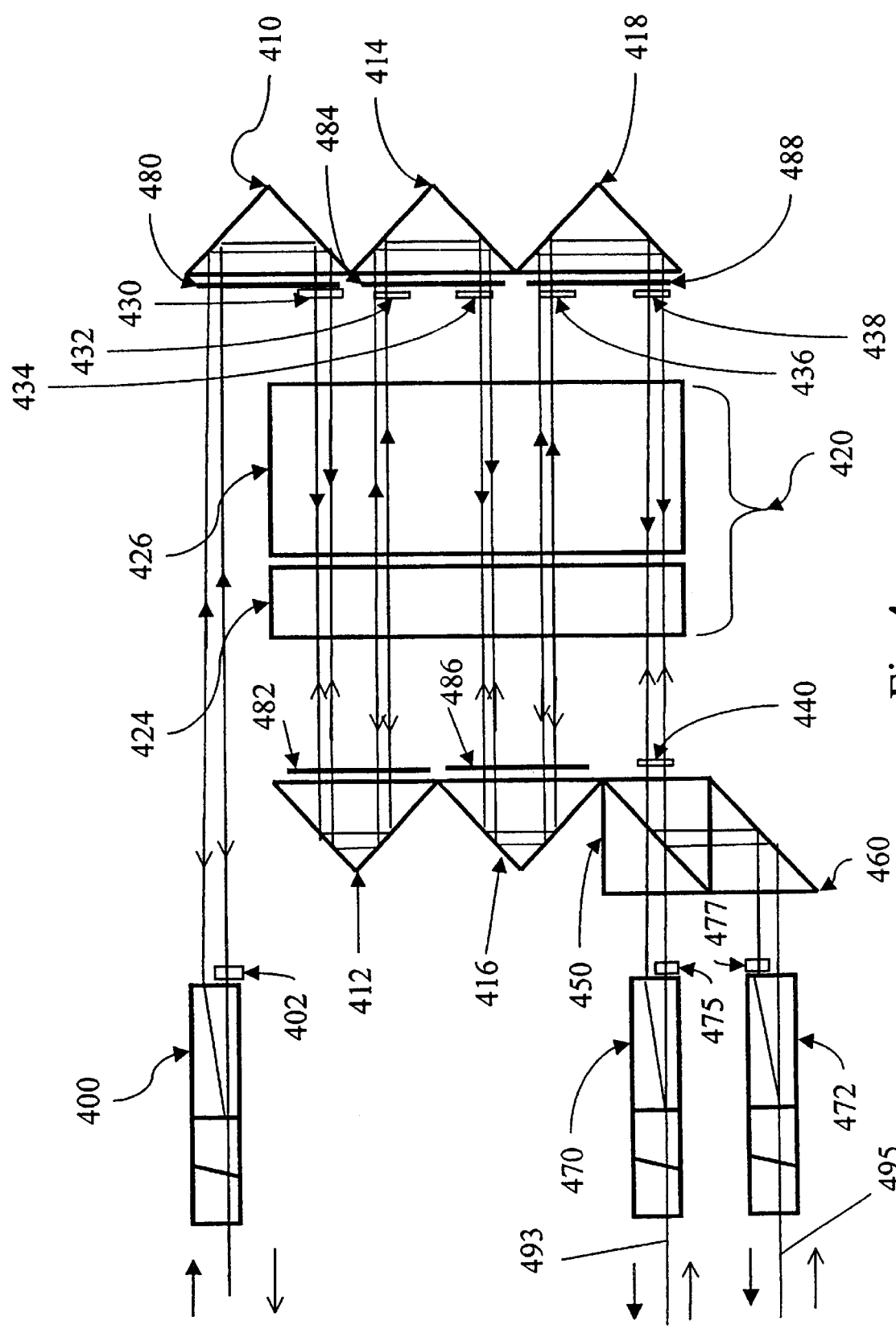
FIG. 4a illustrates one embodiment of a single-pass folded interleaver/deinterleaver having input and output ports on a common side of the device.

FIG. 4a illustrates one embodiment of a single-pass folded interleaver/deinterleaver having input and output ports on a common side of the device. As in all of the Figures, the arrows with solid heads in FIG. 4 correspond to the single-pass folded interleaver/deinterleaver device operating as a deinterleaver, while the arrows with thin-lined heads correspond to the device operating as an interleaver. In other words an optical signal carrying information on multiple frequencies, for example, a wavelength division multiplexed (WDM) signal is received and separated into two optical signals, each of which include a predetermined subset of frequencies (e.g., even channels and odd channels) from the input optical signal.

An optical signal is received through port 400. In one embodiment, port 400 is a collimator assembly having a GRIN lens to collimate the light. Other types of lenses can also be used, or pre-collimated light can be received. Port 400 receives an optical signal via an optical fiber and collimates the optical signal with the GRIN lens.

In one embodiment, port 400 also includes half wave plate 402 to rotate either the vertically polarized component or the horizontally polarized component of the optical signal. In one embodiment, half wave plate 402 has an azimuth angle of 45° with respect to an optical signal received by port 400 from optical fiber 404. In one embodiment, the walk-off crystal of port 400 offsets the vertically polarized component of the optical signal and half wave plate 402 causes the vertically polarized component to be horizontally polarized such that both components are horizontally polarized.

The collimated optical signal is directed to reflective element 410. In one embodiment, reflective element 410 is a 90° reflecting crystal; however, other reflective elements can be used based on, for example, the physical layout of the interleaver/deinterleaver. In one embodiment, the face(s) through which the optical signal is received and/or reflected has low-order compensator 480 component to compensate for phase shift in the respective crystals. If the reflective element does not cause a phase shift, low-order compensator 480 can be omitted.

The optical signal reflected by reflective element 410 is directed through half wave plate 430. Half wave plate 430 introduces a relative phase difference of 180° between the ordinary and extraordinary components of the optical signal. In one embodiment, half wave plate 430 is oriented with a first predetermined azimuth angle. In one embodiment, the first azimuth angle is in the range of 0° to 10° (e.g., 3.5°) for optical signals passing from reflective element 410 to birefringent assembly 420; however, the azimuth angle can be different with appropriate changes to the angles of one or more other half wave plates.

After passing through half wave plate 430, the optical signal is directed to birefringent assembly 420. In one embodiment, birefringent assembly 420 is composed of crystals 424 and 426 that are selected to provide improved thermal stability over a range of operating temperatures as compared to a single birefringent crystal. In one embodiment, crystal 424 is a $TiO_2$ crystal having a thickness of approximately 2 mm, and crystal 426 is a $YVO_4$ crystal having a thickness of approximately 9.5 mm. In one embodiment, birefringent assembly 420 has a cross sectional area that is 5 mm by 8 mm; however, other sizes can also be used. Other birefringent assemblies can also be used, for example, a single crystal can be used if temperature stability is not important, or other two-crystal birefringent assemblies can be used.

After passing through birefringent assembly 420, the optical signal is reflected by reflective element 412 back through birefringent assembly 420. In one embodiment, reflective element 412 is a 90° reflecting crystal; however, other reflective elements can be used. In one embodiment, the face(s) through which the optical signal is received and/or reflected has low-order compensator 482 to compensate for phase shift in the respective crystals. If the reflective element does not cause a phase shift, low-order compensator 482 can be omitted.

After passing through birefringent assembly 420 as reflected by reflective element 412, the optical signal passes through half wave plate 432. In one embodiment, half wave plate 432 is oriented with the first azimuth angle (e.g., 3.5°) for optical signals passing from birefringent assembly 420 to reflective element 414. Other azimuth angles for half wave plate 432 or for both half wave plate 432 and half wave plate 430 can be used for different filtering characteristics or physical configurations.

After passing through half wave plate 432, the optical signal is reflected by reflective element 414. In one embodiment, reflective element 414 is a 90° reflecting crystal; however, other reflective elements can be used. In one embodiment, the face(s) through which the optical signal is received and/or reflected has low-order compensator 484 to compensate for phase shift in the respective crystals. If the reflective element does not cause a phase shift, low-order compensator 484 can be omitted.

The optical signal reflected by reflective element 414 is directed through half wave plate 434. In one embodiment, half wave plate 434 is oriented with a second predetermined azimuth angle. In one embodiment, the second azimuth angle is in the range of 0° to −10° (e.g., −9°) with respect to an optical signal that passes from reflective element 414 to birefringent assembly 420; however, the azimuth angle can be different with appropriate changes to the azimuth angles of one or more other half wave plates.

After passing through birefringent assembly 420, the optical signal is reflected by reflective element 416 back through birefringent assembly 420. In one embodiment, reflective element 416 is a 90° reflecting crystal; however, other reflective elements can be used. In one embodiment, the face(s) through which the optical signal is received and/or reflected has low-order compensator 486 to compensate for phase shift in the respective crystals. If the reflective element does not cause a phase shift, low-order compensator 486 can be omitted.

After passing through birefringent assembly 420 as reflected by reflective element 416, the optical signal passes through half wave plate 436. In one embodiment, half wave plate 436 is oriented with the second azimuth angle (e.g., −9°) with respect to optical signals that pass from birefringent assembly 420 to reflective element 418. Other azimuth angles for half wave plate 436 or for half wave plate 436 and half wave plate 434 can be used for different filtering characteristics or physical configurations.

After passing through half wave plate 436, the optical signal is reflected by reflective element 418. In one embodiment, reflective element 418 is a 90° reflecting crystal; however, other reflective elements can be used. In one embodiment, the face(s) through which the optical signal is received and/or reflected has low-order compensator 488 to compensate for phase shift in the respective crystals. If the reflective element does not cause a phase shift, low-order compensator 488 can be omitted.

The optical signal reflected by reflective element 418 is directed through half wave plate 438. In one embodiment, half wave plate 438 is oriented with a third predetermined azimuth angle. In one embodiment, the third azimuth angle is 22.5° with respect to optical signals that pass from reflective element 418 to birefringent assembly 420. In an alternate embodiment, the azimuth angle of half wave plate 438 is −22.5° with respect to optical signals that pass from reflective element 418 to birefringent assembly 420.

After passing through birefringent assembly 420, the optical signal passes through half wave plate 440. In one embodiment, half wave plate 440 is oriented with the third predetermined azimuth angle (e.g., 22.5°) with respect to optical signals that pass from birefringent assembly 420 to beam splitter 450. In an alternate embodiment, half wave plate 440 has an azimuth angle of −22.5° with respect to optical signals that pass from birefringent assembly 420 to beam splitter 450.

In one embodiment, the azimuth angles of half wave plates 438 and 440 determine the ports to which the optical signals are directed. If the azimuth angles of half wave plates 438 and 440 are 22.5°, a first set of optical signals (e.g., even channels) is directed to port 470 and a second set of optical signals (e.g., odd channels) is directed to port 472.

If the azimuth angles are −22.5°, the first set of optical signals is directed to port 470 and the second set of optical signals is directed to port 472. Thus, half wave plates 438 and 440 can be used to provide a switching function. In one embodiment, half wave plates 438 and 440 are mechanically movable components. In an alternate embodiment, half wave plates 438 and 440 are voltage-controlled liquid crystal components where the voltage can be used to control the switching state of the components.

The optical signal then passes through polarization beam splitter 450. The polarization beam splitter provides output signals to two output collimators. Polarization beam splitter 450 splits the optical signal based on polarization. The optical signal is split into a horizontally polarized signal and a vertically polarized signal. One output signal (e.g., the horizontally polarized signal) is directed to port 470 and the second output signal (e.g., the vertically polarized signal) is directed to reflective element 460, which reflects the second output signal to port 472. Other beam splitting components can also be used.

Port 470 includes half wave plate 475 and port 472 includes half wave plate 477. In one embodiment, both half wave plate 477 and half wave plate 475 have azimuth angles of 45° with respect to optical signals received from element 460 and polarization beam splitter 450 respectively. Half wave plate 477 and 475 rotate the optical components received such that ports 472 and 470, respectively, each receive a vertically polarized component and a horizontally polarized component, which are combined and directed to optical fibers 493 and 495, respectively.

In one embodiment, one of ports 470 and 472 receives even ITU channels and the other port receives odd ITU channels. Other filtering characteristics can also be provided. For example, a first block of channels (e.g., 1–4) can be directed to one port and a second block of channels (e.g., 5–8) can be directed to the other port.

To operate as an interleaver, two sets of optical signals are input to ports 470 and 472. The two sets of optical signals are combined in a manner that is the reverse of the deinterleaver function described above. The combined (interleaved) optical signal is output through port 400. Thus, the apparatus illustrated in FIG. 4 can operate as an interleaver or as a deinterleaver.

In one embodiment, the interleaver/deinterleaver of FIG. 4a is angle tuned to compensate for manufacturing tolerances. In one embodiment, angle tuning is accomplished by rotating birefringent assembly 420 after the interleaver/deinterleaver has been assembled so that the signals (e.g., ITU channels) interleaved or deinterleaved match the desired characteristics. Birefringent assembly 420 is rotated to increase the optical path length of the signals passing through birefringent assembly 420. When the desired optical path length is provided, birefringent assembly 420 is maintained in the desired position through, for example, use of epoxy or soldering techniques.

Figure 4B:
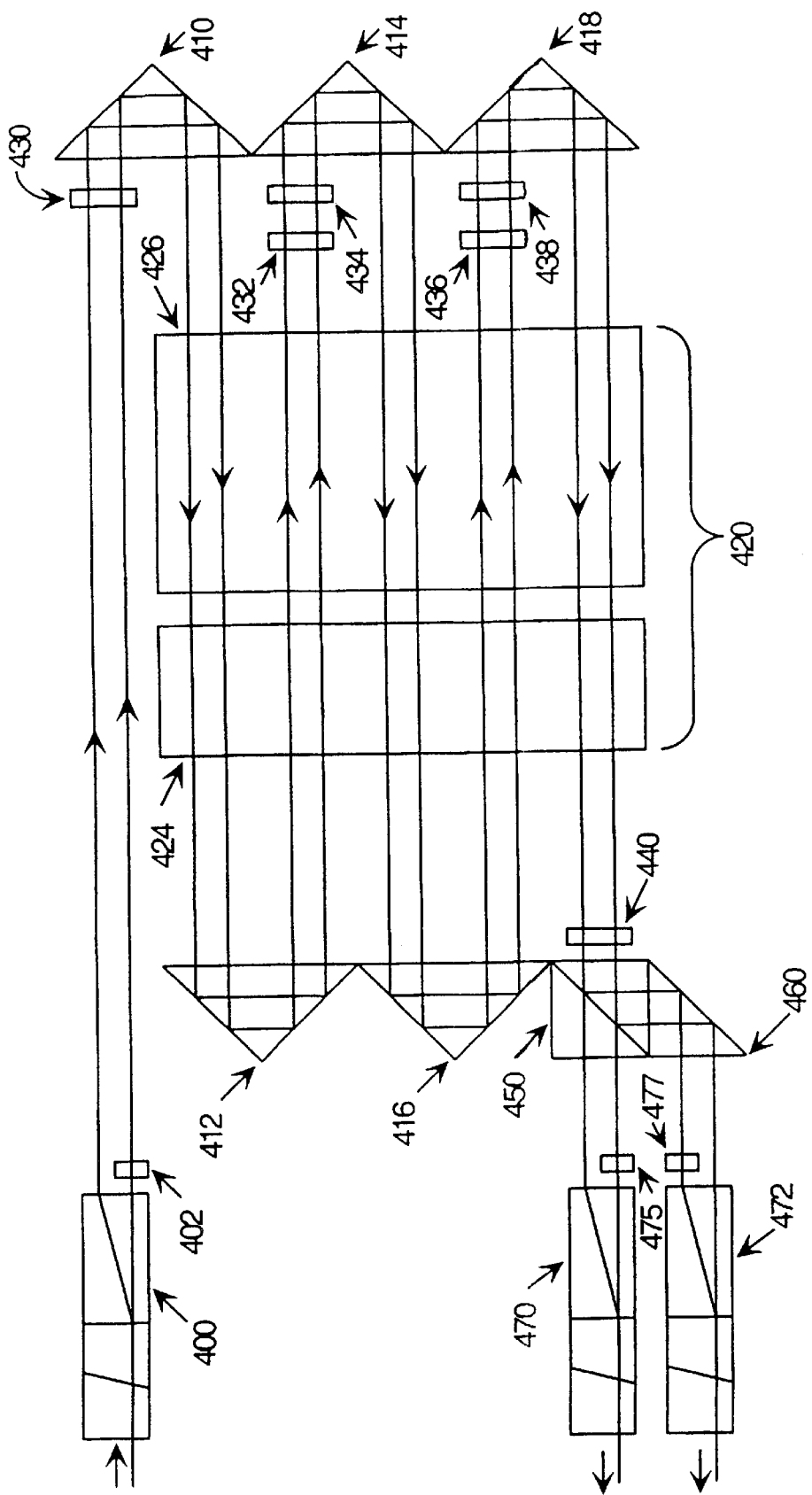
FIG. 4b illustrates one embodiment of a single-pass folded interleaver/deinterleaver having input and output ports on a common side of the device.

FIG. 4b illustrates one embodiment of a single-pass folded interleaver/deinterleaver having input and output ports on a common side of the device. The interleaver/deinterleaver of FIG. 4b includes the same components (e.g., reflective elements, half wave plates, birefringent assembly) as the interleaver/deinterleaver of FIG. 4a; however, the components are arranged in different physical positions for the interleaver/deinterleaver of FIG. 4b compared to the interleaver/deinterleaver of FIG. 4a.

In one embodiment, the interleaver/deinterleaver of FIG. 4b does not include the low-order compensators of the interleaver/deinterleaver of FIG. 4a. The optical compensation of the low-order compensators can be provided by angle tuning birefringent assembly 420. The increase optical path length through material of the interleaver/deinterleaver can be provided by birefringent assembly 420 rather than by the low-order compensators. In an alternate embodiment, the interleaver/deinterleaver of FIG. 4b can include low-order compensators as described above with respect to FIG. 4a.

Figure 5A:
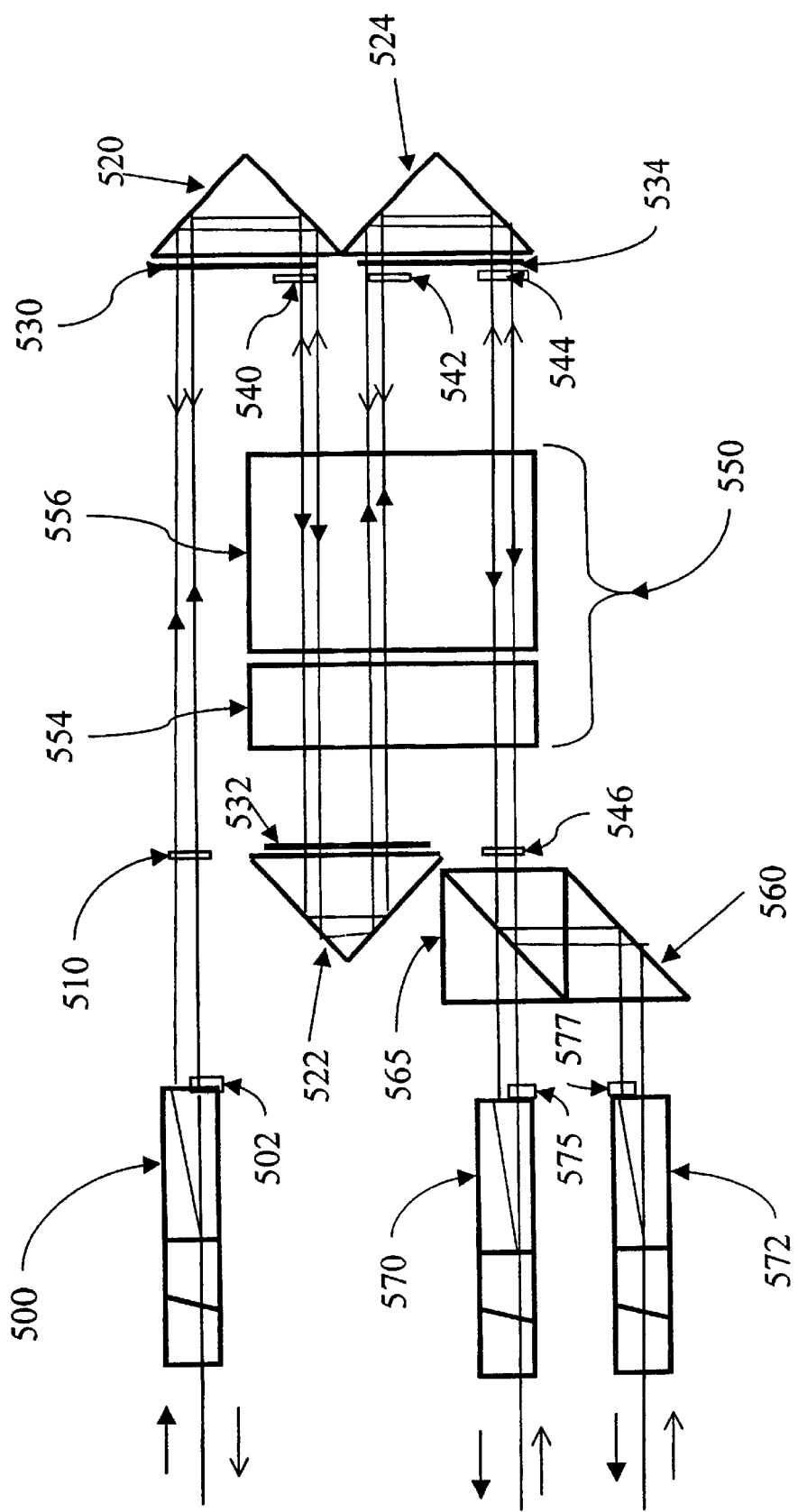
FIG. 5a illustrates one embodiment of a single-pass folded interleaver/ deinterleaver having input and output ports on a common side of the device.

FIG. 5a illustrates one embodiment of a single-pass folded interleaver/deinterleaver having input and output ports on a common side of the device. As with FIG. 4, The arrows of FIG. 5 correspond to the single-pass folded interleaver/deinterleaver operating as a deinterleaver. The interleaver/deinterleaver of FIG. 5 has three reflective elements rather than the five reflective elements of the interleaver/deinterleaver of FIG. 4.

An optical signal is received through port 500. In one embodiment, port 500 is a collimator assembly having a GRIN lens to collimate the light. Other types of lenses can also be used, or pre-collimated light can be received. In one embodiment, port 500 includes a walk-off crystal and half wave plate 502. The walk-off crystal and half wave plate 502 operate to provide two horizontally (or two vertically) polarized components.

The optical signal is passed through polarizer 510. In one embodiment, the polarization provided by polarizer 510 is in the range of 0° to 10° (e.g., 2.6°) for optical signals that pass from port 500 to reflective element 520, however, other polarizations can be provided based on, for example, the azimuth angles of one or more half wave plates.

The polarized optical signal is directed to reflective element 520. In one embodiment, reflective element 520 is a 90° reflecting crystal; however, other reflective elements can be used. In one embodiment, the face(s) through which the optical signal is received and/or reflected has low-order compensator 530 component to compensate for phase shift in the respective crystals. If the reflective element does not cause a phase shift, low-order compensator 530 can be omitted.

The optical signal reflected by reflective element 520 is directed through half wave plate 540. In one embodiment, half wave plate 540 is oriented with a first predetermined azimuth angle. In one embodiment, the first azimuth angle is in the range of 0° to −10° (e.g., -6.7°) with respect to optical signals that pass from reflective element 520 to birefringent assembly 550; however, the azimuth angle can be different with appropriate changes to the azimuth angles of one or more other half wave plates and/or polarizer 510.

After passing through half wave plate 540, the optical signal is directed to birefringent assembly 520. In one embodiment, birefringent assembly 520 is composed of crystals 554 and 556 that are selected to provide improved thermal stability over a range of operating temperatures as compared to a single birefringent crystal. In one embodiment, crystal 554 is a $TiO_2$ crystal having a thickness of 2 mm, and crystal 556 is a $YVO_4$ crystal having a thickness of 9.5 mm. In one embodiment, birefringent assembly 550 has a 6 mm by 5 mm cross sectional area; however, other sizes can also be used. Other birefringent assemblies can also be used, for example, a single crystal can be used if temperature stability is not important, or other two-crystal birefringent assemblies can be used.

After passing through birefringent assembly 550, the optical signal is reflected by reflective element 522 back through birefringent assembly 550. In one embodiment, reflective element 522 is a 90° reflecting crystal; however, other reflective elements can be used. In one embodiment, the face(s) through which the optical signal is received and/or reflected has low-order compensator 532 to compensate for phase shift in the respective crystals. If the reflective element does not cause a phase shift, low-order compensator 532 can be omitted.

After passing through birefringent assembly 550 as reflected by reflective element 524, the optical signal passes through half wave plate 542. In one embodiment, half wave plate 542 is oriented with the first azimuth angle (e.g., −6.7°) with respect to optical signals that pass from birefringent assembly 550 to reflective element 524. Other azimuth angles can be used for half wave plate 542 or for half wave plate 542 and half wave plate 540 for different filtering characteristics or physical configurations.

After passing through half wave plate 542, the optical signal is reflected by reflective element 524. In one embodiment, reflective element 524 is a 90° reflecting crystal; however, other reflective elements can be used. In one embodiment, the face(s) through which the optical signal is received and/or reflected has low-order compensator 534 to compensate for phase shift in the respective crystals. If the reflective element does not cause a phase shift, low-order compensator 534 can be omitted.

The optical signal reflected by reflective element 524 is directed through half wave plate 544. In one embodiment, half wave plate 544 is oriented with a second predetermined azimuth. In one embodiment, the second azimuth angle is 22.5°. In an alternate embodiment, the azimuth angle is −22.5°. After passing through birefringent assembly 550, the optical signal passes through half wave plate 546. In one embodiment, half wave plate 546 is oriented with an azimuth angle of 22.5°. In an alternate embodiment, the azimuth angle is −22.5°.

In one embodiment, the azimuth angles of half wave plates 544 and 546 determine the ports to which the optical signals are directed. If the azimuth angles of half wave plates 544 and 546 are 22.5°, a first set of optical signals (e.g., even channels) is directed to port 570 and a second set of optical signals (e.g., odd channels) is directed to port 572. If the azimuth angles are −22.5°, the first set of optical signals is directed to port 570 and the second set of optical signals is directed to port 572. Thus, half wave plates 544 and 546 can be used to provide a switching function. In one embodiment, half wave plates 544 and 546 are mechanically movable components. In an alternate embodiment, half wave plates 544 and 546 are voltage-controlled liquid crystal components where the voltage can be used to control the switching state of the components.

In one embodiment, the optical signal then passes through polarization beam splitter 565. The polarization beam splitter feeds two output collimators. Polarization beam splitter 565 splits the optical signal based on polarization. The optical signal is split into a horizontally polarized signal and a vertically polarized signal. One output signal (e.g., the horizontally polarized signal) is directed to port 570 and the second output signal (e.g., the vertically polarized signal) is directed to reflective element 560, which reflects the second output signal to port 572. Ports 570 and 572 focus the output signals to optical fibers. In one embodiment, one of ports 570 and 572 receives even ITU channels and the other port receives odd ITU channels. Other filtering characteristics can also be provided. In one embodiment, ports 570 and 572 include walk-off crystals and half wave plates 575 and 577, respectively, rotate component of the optical signal received.

In one embodiment, the interleaver/deinterleaver of FIG. 5a is angle tuned to compensate for manufacturing tolerances. In one embodiment, angle tuning is accomplished by rotating birefringent assembly 550 as described above with respect to birefringent assembly 420 of FIG. 4a.

To operate as an interleaver, two sets of optical signals are input to ports 570 and 572. The two sets of optical signals are combined in a manner that is the reverse of the deinterleaver function described above. The combined (interleaved) optical signal is output through port 500. Thus, the apparatus illustrated in FIG. 5 can operate as an interleaver or as a deinterleaver.

Figure 5B:
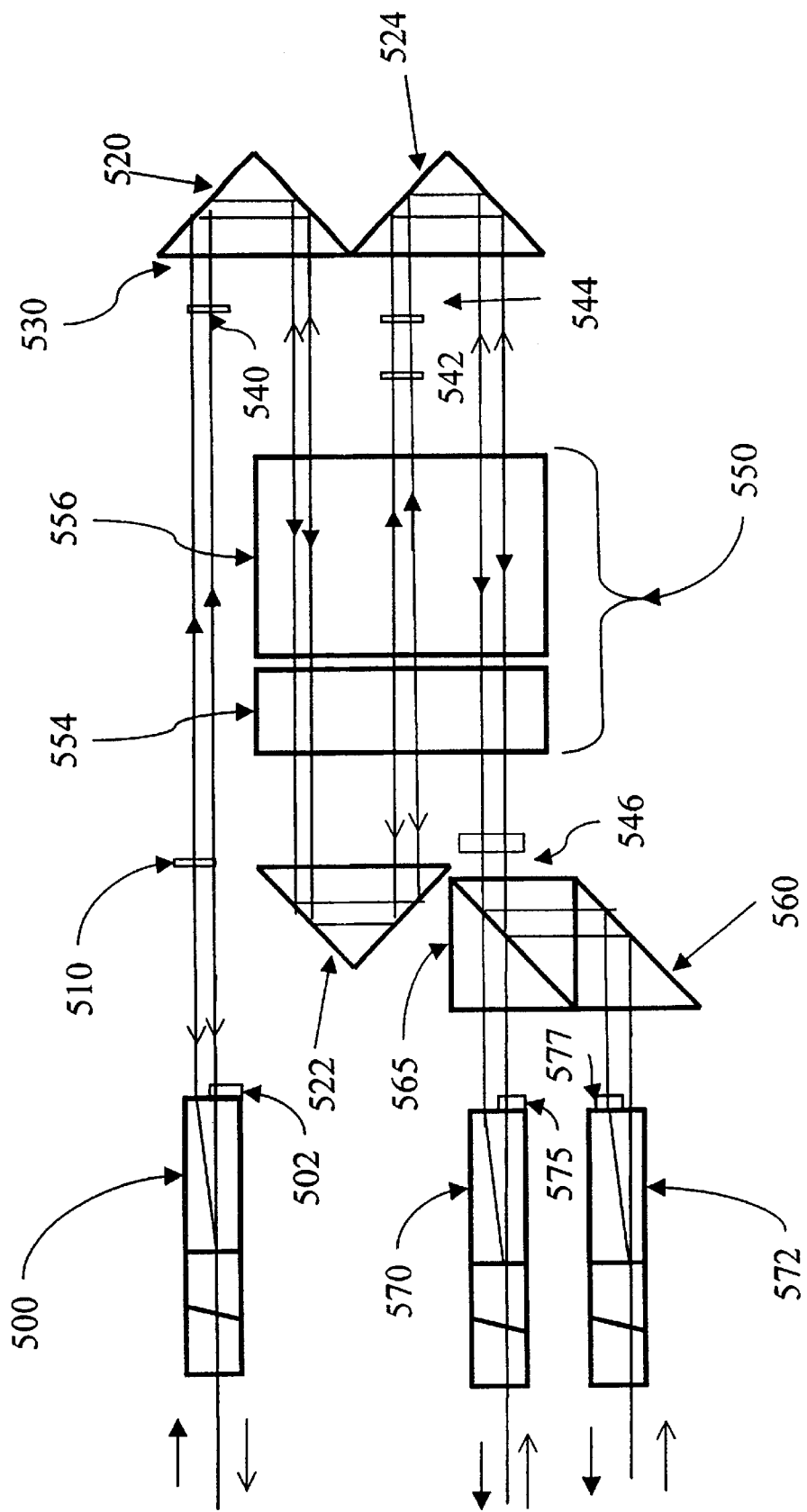
FIG. 5b illustrates one embodiment of a single-pass folded interleaver/deinterleaver having input and output ports on a common side of the device.

FIG. 5b illustrates one embodiment of a single-pass folded interleaver/deinterleaver having input and output ports on a common side of the device. The interleaver/deinterleaver of FIG. 5b includes the same components (e.g., polarizer, reflective elements, half wave plates, birefringent assembly) as the interleaver/deinterleaver of FIG. 5a; however, the components are arranged in different physical positions for the interleaver/deinterleaver of FIG. 5b compared to the interleaver/deinterleaver of FIG. 5a.

In one embodiment, the interleaver/deinterleaver of FIG. 5b does not include the low-order compensators of the interleaver/deinterleaver of FIG. 5a. The optical compensation of the low-order compensators can be provided by angle tuning birefringent assembly 550. The increase optical path length through material of the interleaver/deinterleaver can be provided by birefringent assembly 550 rather than by the low-order compensators. In an alternate embodiment, the interleaver/deinterleaver of FIG. 5b can include low-order compensators as described above with respect to FIG. 5a.

Figure 5C:
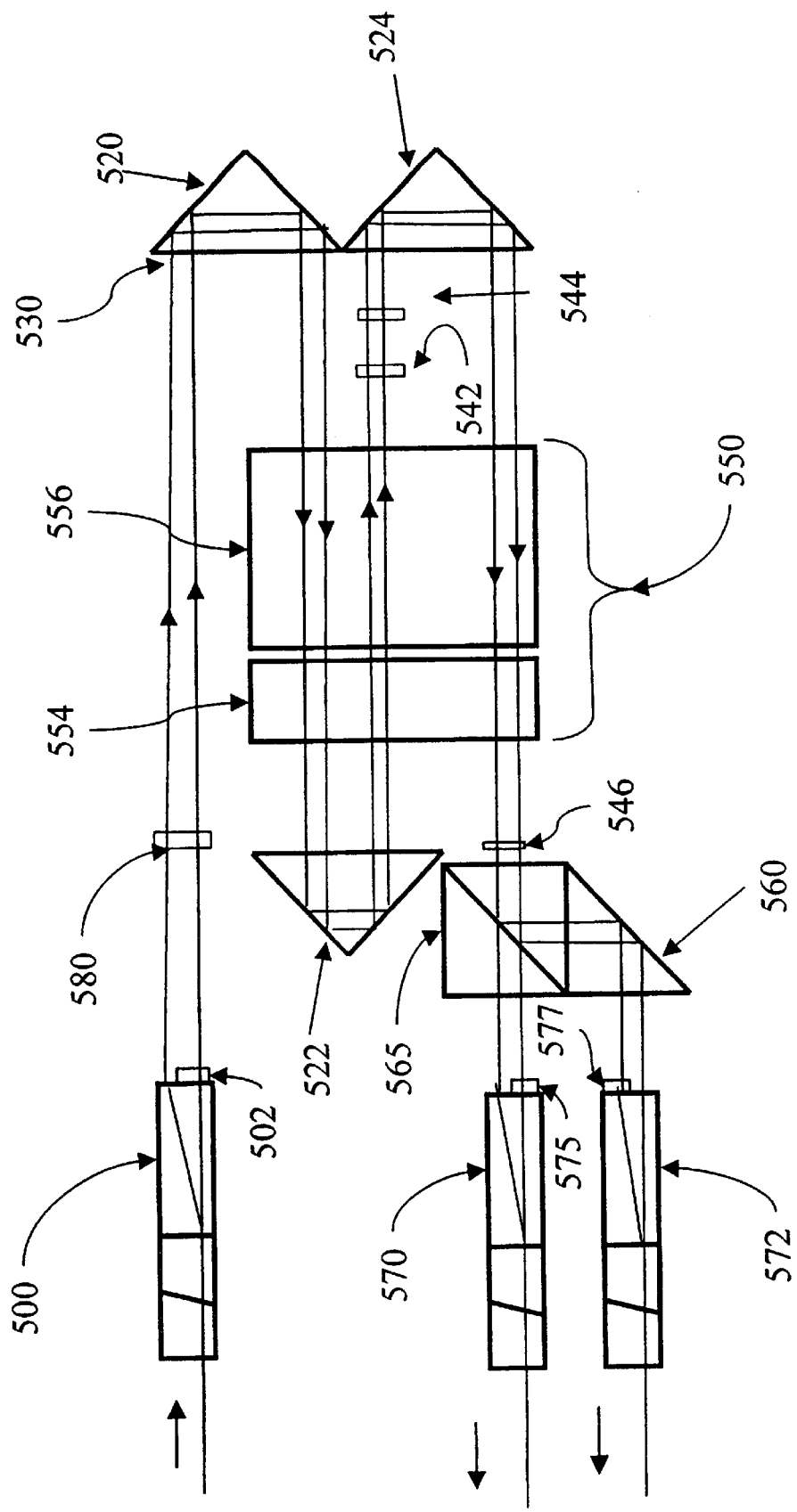
FIG. 5c illustrates one embodiment of a single-pass folded interleaver/deinterleaver having input and output ports on a common side of the device.

FIG. 5c illustrates one embodiment of a single-pass folded interleaver/deinterleaver having input and output ports on a common side of the device. The interleaver/deinterleaver of FIG. 5c includes the same components (e.g., reflective elements, half wave plates, birefringent assembly) as the interleaver/deinterleavers of FIGS. 5a and 5b with one exception. Half wave plate 580 replaces polarizer 510 and half wave plate 540 of FIGS. 5a and 5b. The remaining components are arranged in different physical positions for the interleaver/deinterleaver of FIG. 5c compared to the interleaver/deinterleaver of FIGS. 5a and 5b. In one embodiment, half wave plate 580 has an azimuth angle of −8° with respect to optical signals that pass from port 500 to reflective element 520; however, other angles could also be used.

In one embodiment, the interleaver/deinterleaver of FIG. 5c does not include the low-order compensators of the interleaver/deinterleaver of FIG. 5a. The optical compensation of the low-order compensators can be provided by angle tuning, birefringent assembly 550. The increase optical path length through material of the interleaver/deinterleaver can be provided by birefringent assembly 550 rather than by the low-order compensators. In an alternate embodiment, the interleaver/deinterleaver of FIG. 5c can include low-order compensators as described above with respect to FIGS. 5a and 5b.

Figure 6A:
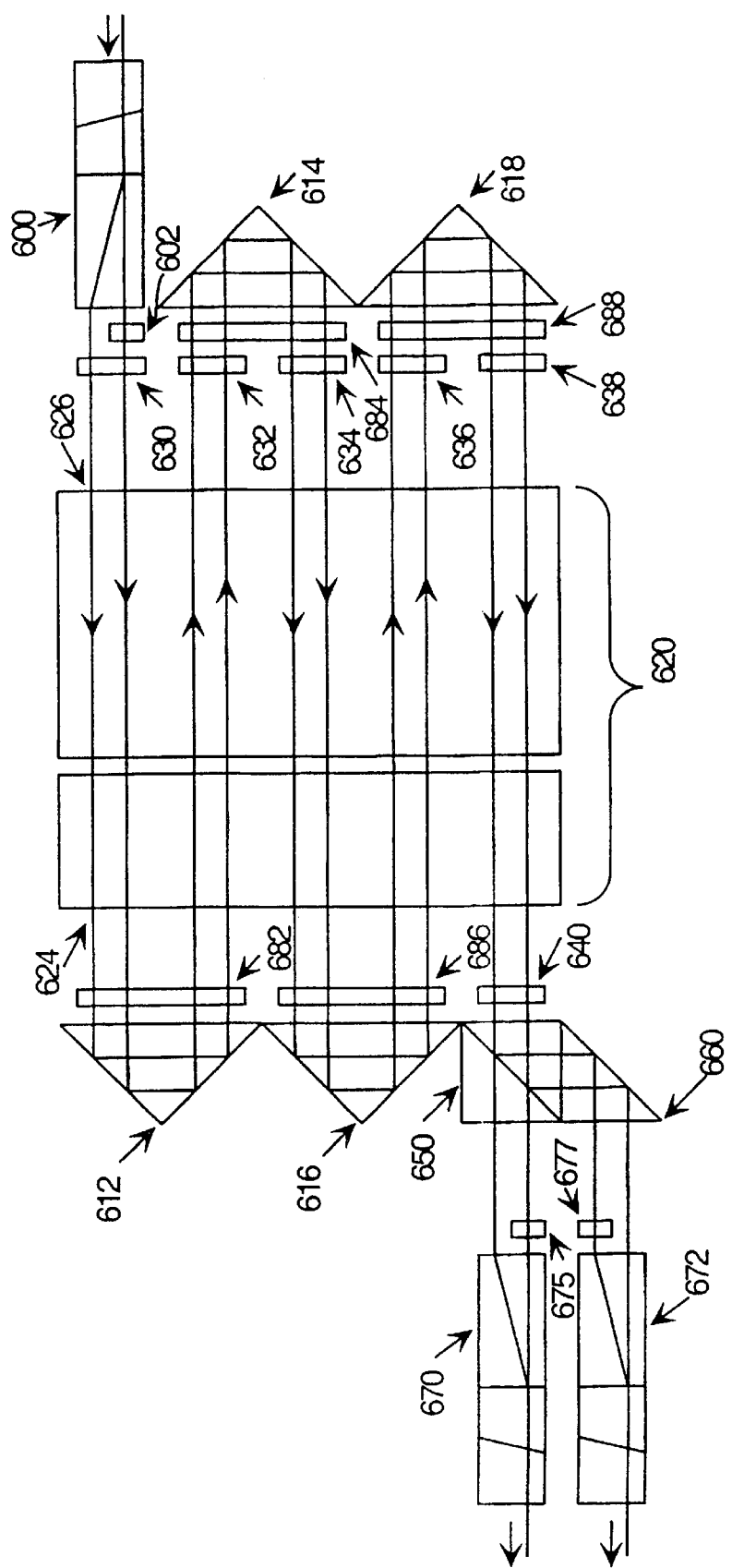
FIG. 6a illustrates one embodiment of a single-pass folded interleaver/deinterleaver having input and output ports on opposite sides of the device.

FIG. 6a illustrates on e embodiment of a single-pass folded interleaver/deinterleaver having input and output ports on opposite sides of the device. As with FIGS. 4 and 5 above, the arrows of FIG. 6 correspond to the single-pass folded interleaver/deinterleaver operating as a deinterleaver.

An optical signal is received through port 600. In one embodiment, port 600 is a collimator assembly having GRIN lens to collimate the light. Other types of lenses can also be used, or pre-collimated light can be received. In one embodiment, port 600 includes a walk-off crystal and half wave plate 602. The walk-off crystal and half wave plate 602 operate to provide two horizontally (or two vertically) polarized components.

The collimated optical signal is directed through half wave plate 630. In one embodiment, half wave plate 630 is oriented with a first predetermined azimuth angle. In one embodiment, the angle is in the range of 0° to 10° (e.g., 3.5°) with respect to optical signals that pass from port 600 to birefringent assembly 620; however, the azimuth angle can be different with appropriate changes to the azimuth angles of one or more other half wave plates.

After passing through half wave plate 630, the optical signal is directed to birefringent assembly 620. In one embodiment, birefringent assembly 620 is composed of crystals 624 and 626 that are selected to provide thermal stability over a range of operating temperatures. In one embodiment, crystal 624 is a $TiO_2$ crystal having a thickness of 2 mm, and crystal 626 is a $YVO_4$ crystal having a thickness of 9.5 mm. Other birefringent assemblies can also be used.

After passing through birefringent assembly 620, the optical signal is reflected by reflective element 612 back through birefringent assembly 620. In one embodiment, reflective element 612 is a 90° reflecting crystal; however, other reflective elements can be used. In one embodiment, the face(s) through which the optical signal is received and/or reflected has low-order compensator 682 to compensate for phase shift in the respective crystals. If the reflective element does not cause a phase shift, low-order compensator 682 can be omitted.

After passing through birefringent assembly 620 as reflected by reflective element 612, the optical signal passes through half wave plate 632. In one embodiment, half wave plate 632 is oriented with the first azimuth angle (e.g., 3.5°) with respect to optical signals that pass from birefringent assembly 620 to reflective element 614. Other azimuth angles can be used for half wave plate 632 or for half wave plate 632 and half wave plate 630 for different filtering characteristics or physical configurations.

After passing through half wave plate 632, the optical signal is reflected by reflective element 614. In one embodiment, reflective element 614 is a 90° reflecting crystal; however, other reflective elements can be used. In one embodiment, the face(s) through which the optical signal is received and/or reflected has low-order compensator 684 to compensate for phase shift in the respective crystals. If the reflective element does not cause a phase shift, low-order compensator 684 can be omitted.

The optical signal reflected by reflective element 614 is directed through half wave plate 634. In one embodiment, half wave plate 634 is oriented with a second predetermined azimuth angle. In one embodiment, the second azimuth angle is in the range of 0° to −10° (e.g., —9°) with respect to optical signals that pass from reflective element 614 to birefringent assembly 620; however, the azimuth angle can be different with appropriate changes to the angles of one or more other half wave plates.

After passing through birefringent assembly 620, the optical signal is reflected by reflective element 616 back through birefringent assembly 620. In one embodiment, element 616 is a 90° reflecting crystal; however, other reflective elements can be used. In one embodiment, the face(s) through which the optical signal is received and/or reflected has low-order compensator 686 to compensate for phase shift in the respective crystals. If the reflective element does not cause a phase shift, low-order compensator 686 can be omitted.

After passing through birefringent assembly 620 as reflected by reflective element 616, the optical signal passes through half wave plate 636. In one embodiment, half wave plate 636 is oriented with the third azimuth angle (e.g., −9°) with respect to optical signals that pass from birefringent assembly 620 to reflective element 618. Other azimuth angles can be used for hall wave plate 636 or half wave plate 636 and half wave plate 634 for different filtering characteristics or physical configurations.

After passing through half wave plate 636, the optical signal is reflected by reflective element 618. In one embodiment, reflective element 618 is a 90° reflecting crystal; however, other reflective elements can be used. In one embodiment, the face(s) through which the optical signal is received and/or reflected has low-order compensator 688 to compensate for phase shift in the respective crystals. If the reflective element does not cause a phase shift, low-order compensator 688 can be omitted.

The optical signal reflected by reflective element 618 is directed through half wave plate 638. In one embodiment, half wave plate 638 is oriented with a third predetermined azimuth angle. In one embodiment, the third azimuth angle is 22.5°. In an alternate embodiment, the azimuth angle is −22.5° After passing through birefringent assembly 620, the optical signal passes through half wave plate 640. In one embodiment, half wave plate 640 is oriented with an azimuth angle of 22.5°. In an alternate embodiment, the azimuth angle is −22.5°.

In one embodiment, the azimuth angles of half wave plates 638 and 640 determine the ports to which the optical signals are directed. If the azimuth angles of half wave plates 638 and 640 are 22.5°, a first set of optical signals (e.g., even channels) is directed to port 670 and a second set of optical signals (e.g., odd channels) is directed to port 672. If the azimuth angles are −22.5°, the first set of optical signals is directed to port 670 and the second set of optical signals is directed to port 672. Thus, half wave plates 638 and 640 can be used to provide a switching function. In one embodiment, half wave plates 638 and 640 are mechanically movable components. In an alternate embodiment, half wave plates 638 and 640 are voltage-controlled liquid crystal components where the voltage can be used to control the switching state of the components.

After passing through birefringent assembly 620, the optical signal passes through half wave plate 640. In one embodiment, half wave plate 640 is oriented with the third predetermined azimuth angle; however, other azimuth angles can also be used. In one embodiment, the optical signal then passes through polarization beam splitter 650. The polarization beam splitter requires two output collimators.

Polarization beam splitter 650 splits the optical signal based on polarization. The optical signal is split into a horizontally polarized signal and a vertically polarized signal. One output signal (e.g., the horizontally polarized signal) is directed to port 670 and the second output signal (e.g., the vertically polarized signal) is directed to reflective element 660, which reflects the second output signal to port 672. Ports 670 and 672 focus the output signals to optical fibers. In one embodiment one output signal includes even ITU channels and the other output signal includes odd ITU channels. In one embodiment, ports 670 and 672 include walk-off crystals and half wave plates 675 and 677, respectively, rotate component of the optical signal received.

In one embodiment, the interleaver/deinterleaver of FIG. 6*a* is angle tuned to compensate for manufacturing tolerances. In one embodiment, angle tuning is accomplished by rotating birefringent assembly 620 as described above with respect to birefringent assembly 420 of FIG. 4a.

To operate as an interleaver, two sets of optical signals are input to ports 670 and 672. The two sets of optical signals are combined in a manner that is the reverse of the deinterleaver function described above. The combined optical signal is output through port 600. Thus, the apparatus illustrated in FIG. 6 can operate as an interleaver or as a deinterleaver.

Figure 6B:
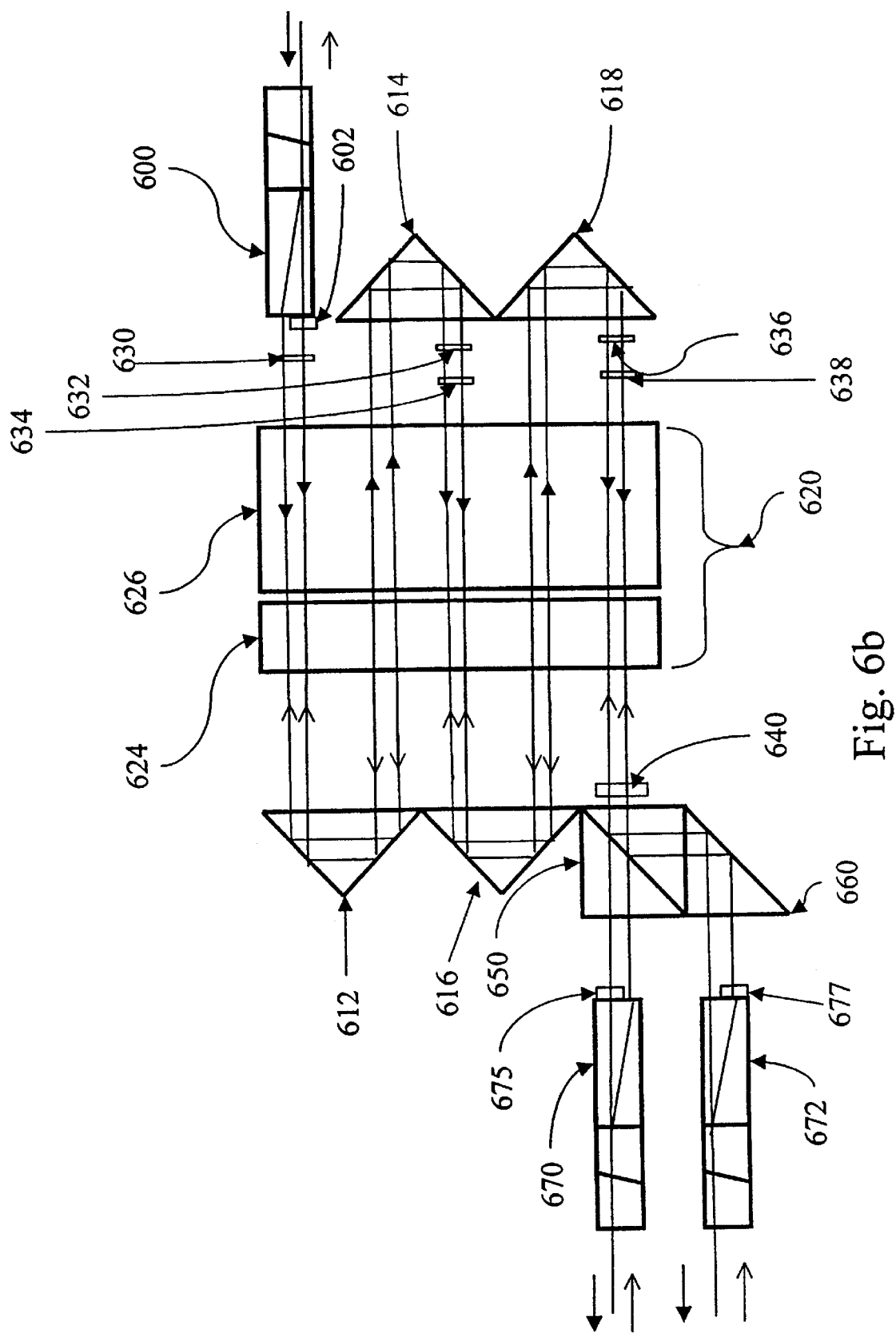
FIG. 6b illustrates one embodiment of a single-pass folded interleaver/deinterleaver having input and output ports on opposite sides of the device.

FIG. 6b illustrates one embodiment of a single-pass folded interleaver/deinterleaver having input and output ports on opposite sides of the device. The interleaver/deinterleaver of FIG. 6b includes the same components (e.g., reflective elements, half wave plates, birefringent assembly) as the interleaver/deinterleaver of FIG. 6a; however, the components are arranged in different physical positions for the interleaver/deinterleaver of FIG. 6b compared to the interleaver/deinterleaver of FIG. 6a.

In one embodiment, the interleaver/deinterleaver of FIG. 6b does not include the low-order compensators of the interleaver/deinterleaver of FIG. 6a. The optical compensation of the low-order compensators can be provided by angle tuning birefringent assembly 620. The increase optical path length through material of the interleaver/deinterleaver can be provided by birefringent assembly 620 rather than by the low-order compensators. In an alternate embodiment, the interleaver/deinterleaver of FIG. 6b can include low-order compensators as described above with respect to FIG. 6a.

Figure 7A:
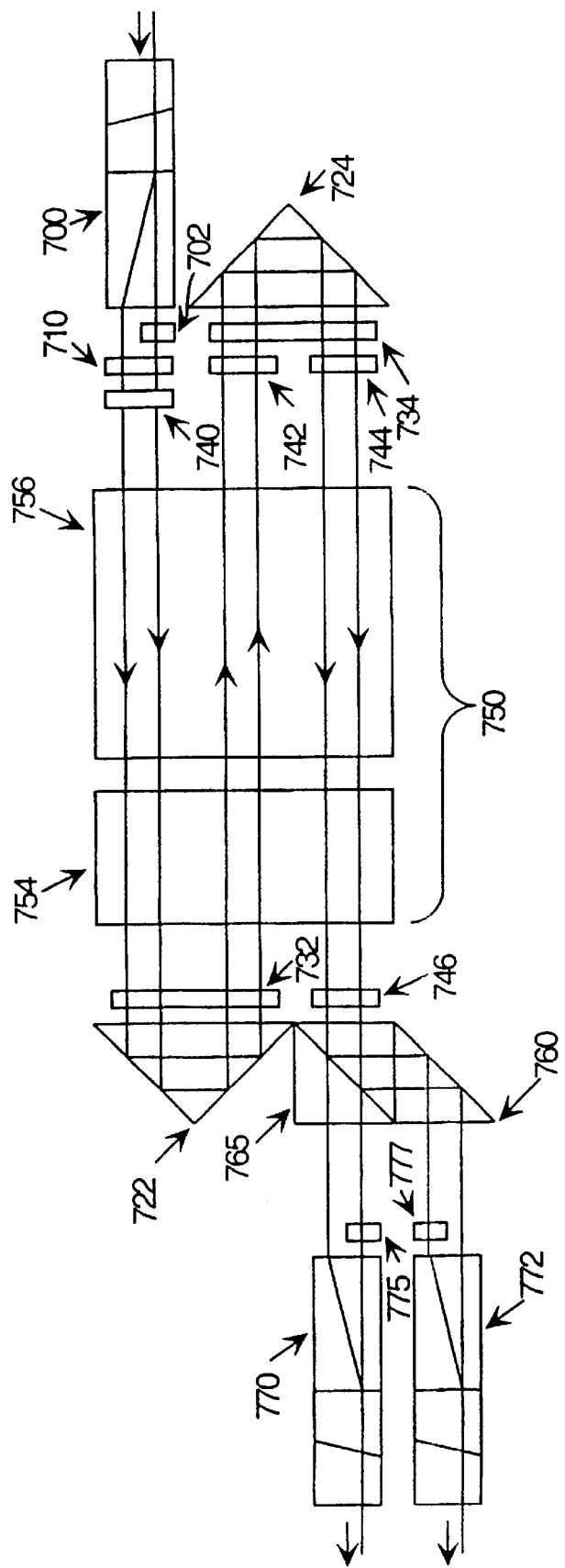
FIG. 7a illustrates one embodiment of a single-pass folded interleaver/deinterleaver having input and output ports on opposite sides of the device.

FIG. 7a illustrates one embodiment of a single-pass folded interleaver/deinterleaver having input and output ports on opposite sides of the device. As with FIGS. 4–6, the arrows of FIG. 7 correspond to the single-pass folded interleaver/deinterleaver operating as a deinterleaver. The interleaver/deinterleaver of FIG. 7 has three reflective elements rather than the five reflective elements of the interleaver/deinterleaver of FIG. 6.

An optical signal is received through port 700. In one embodiment, port 700 is a collimator assembly having a GRIN lens to collimate the light. Other types of lenses can also be used, or pre-collimated light can be received. In one embodiment, port 700 includes a walk-off crystal and half wave plate 702. The walk-off crystal and half wave plate 702 operate to provide two horizontally (or two vertically) polarized components.

The optical signal is passed through polarizer 710. In one embodiment, the polarization provided by polarizer 710 is in the range of 0° to 10° (e.g., 2.6°) with respect to optical signals that pass from port 700 to birefringent assembly 750; however, other polarizations can be provided based on, for example, the azimuth angles of one or more half wave plates. The polarized optical signal is directed through half wave plate 740. In one embodiment, half wave plate 740 is oriented with a first predetermined azimuth angle. In one embodiment, the angle is in the range of 0° to —10° (e.g., −6.7°) with respect to optical signals that pass from port 700 to birefringent assembly 750; however, the azimuth angle can be different with appropriate changes to the azimuth angles of one or more other half wave plates.

After passing through half wave plate 740, the optical signal is directed to birefringent assembly 750. In one embodiment, birefringent assembly 750 is composed of crystals 754 and 756 that are selected to provide thermal stability over a range of operating temperatures. In one embodiment, crystal 754 is a $TiO_2$ crystal having a thickness of 2 mm, and crystal 756 is a $YVO_4$ crystal having a thickness of 9.5 mm; however, other sizes can also be used. Other birefringent assemblies can also be used.

After passing through birefringent assembly 750, the optical signal is reflected by reflective element 722 back through birefringent assembly 750. In one embodiment, reflective element 722 is a 90° reflecting crystal; however, other reflective elements can be used. In one embodiment, the face(s) through which the optical signal is received and/or reflected has low-order compensator 732 to compensate for phase shift in the respective crystals. If the reflective element does not cause a phase shift, low-order compensator 732 can be omitted.

After passing through birefringent assembly 750 as reflected by reflective element 724, the optical signal passes through half wave plate 742. In one embodiment, half wave plate 742 is oriented with the first azimuth angle (e.g., −6.7°) with respect to optical signals that pass from birefringent assembly 750 to reflective element 724. Other azimuth angles can be used for half wave plate 742 or for half wave plate 742 and half wave plate 740 for different filtering characteristics or physical configurations.

After passing through half wave plate 742, the optical signal is reflected by reflective element 724. In one embodiment, reflective element 724 is a 90° reflecting crystal; however, other reflective elements can be used. In one embodiment, the face(s) through which the optical signal is received and/or reflected has low-order compensator 734 to compensate for phase shift in the respective crystals. If the reflective element does not cause a phase shift, low-order compensator 734 can be omitted.

The optical signal reflected by reflective element 724 is directed through half wave plate 744. In one embodiment, half wave plate 744 is oriented with a second predetermined azimuth angle. In one embodiment, the second azimuth angle is 22.5°. In an alternate embodiment, the azimuth angle is −22.5° After passing through birefringent assembly 750, the optical signal passes through half wave plate 746. In one embodiment, half wave plate 746 is oriented with an azimuth angle of 22.5° with respect to optical signals that pass from birefringent assembly 750 to beam splitter 765. In an alternate embodiment, the azimuth angle of half wave plate 746 is −22.5°.

In one embodiment, the azimuth angles of half wave plates 744 and 746 determine the ports to which the optical signals are directed. If the azimuth angles of half wave plates 744 and 746 are 22.5°, a first set of optical signals (e.g., even channels) is directed to port 770 and a second set of optical signals (e.g., odd channels) is directed to port 772. If the azimuth angles are −22.5°, the first set of optical signals is directed to port 770 and the second set of optical signals is directed to port 772. Thus, half wave plates 744 and 746 can be used to provide a switching function. In one embodiment, half wave plates 744 and 746 are mechanically movable components. In an alternate embodiment, half wave plates 744 and 746 are voltage-controlled liquid crystal components where the voltage can be used to control the switching state of the components.

In one embodiment, the optical signal then passes through polarization beam splitter 765. The polarization beam splitter requires two output collimators. Polarization beam splitter 765 splits the optical signal based on polarization. The optical signal is split into a horizontally polarized signal and a vertically polarized signal. One output signal (e.g., the horizontally polarized signal) is directed to port 770 and the second output signal (e.g., the vertically polarized signal) is directed to reflective element 760, which reflects the second output signal to port 772. Ports 770 and 772 focus the output signals to optical fibers. In one embodiment, ports 770 and 772 include walk-off crystals and half wave plates 775 and 777, respectively, to rotate one component of the optical signal received.

In one embodiment, the interleaver/deinterleaver of FIG. 7a is angle tuned to compensate for manufacturing tolerances. In one embodiment, angle tuning is accomplished by rotating birefringent assembly 750 as described above with respect to birefringent assembly 420 of FIG. 4a.

To operate as an interleaver, two sets of optical signals are input to ports 770 and 772. The two sets of optical signals are combined in a manner that is the reverse of the deinterleaver function described above. The combined optical signal is output through port 700. Thus, the apparatus illustrated in FIG. 7 can operate as an interleaver or as a deinterleaver.

Figure 7B:
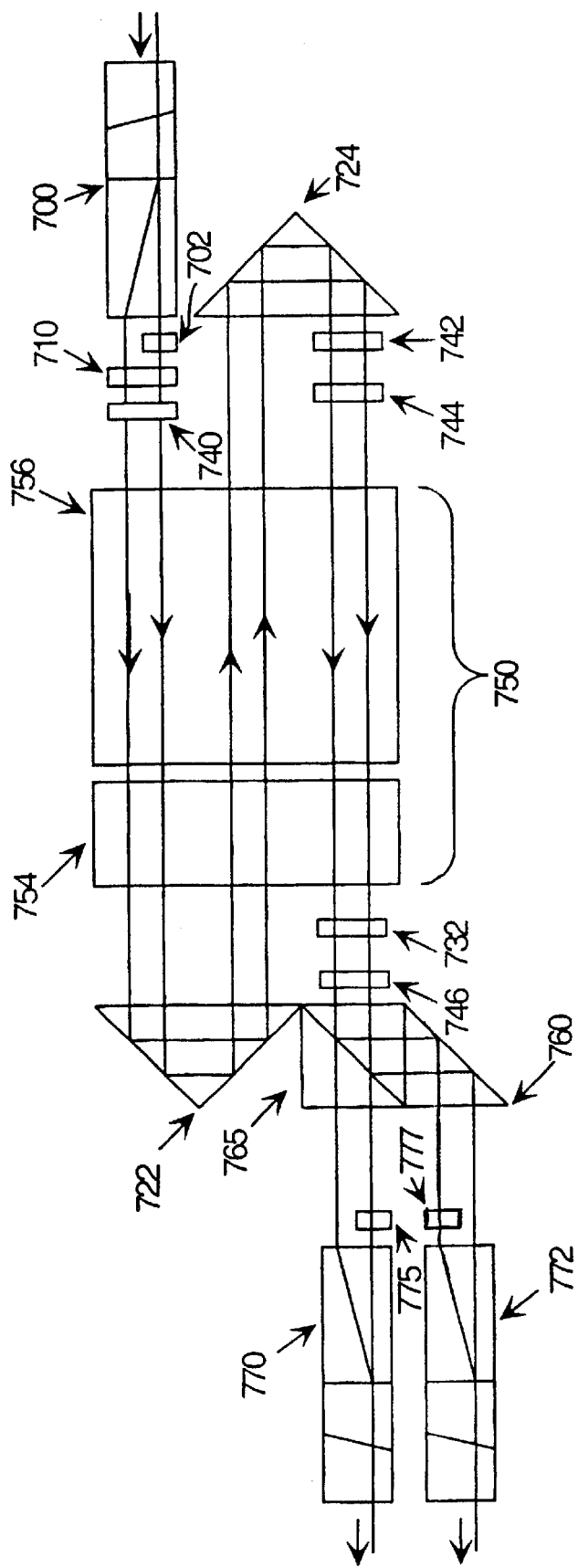
FIG. 7b illustrates one embodiment of a single-pass folded interleaver/deinterleaver having input and output ports on opposite sides of the device.

FIG. 7b illustrates one embodiment of a single-pass folded interleaver/deinterleaver having input and output ports on opposite sides of the device. The interleaver/deinterleaver of FIG. 7b includes the same components (e.g., reflective elements, half wave plates, birefringent assembly) as the interleaver/deinterleaver of FIG. 7a; however, the components are arranged in different physical positions for the interleaver/deinterleaver of FIG. 7b compared to the interleaver/deinterleaver of FIG. 7a.

In one embodiment, the interleaver/deinterleaver of FIG. 7b does not include the low-order compensators of the interleaver/deinterleaver of FIG. 7a. The optical compensation of the low-order compensators can be provided by angle tuning birefringent assembly 750. The increase optical path length through material of the interleaver/deinterleaver can be provided by birefringent assembly 750 rather than by the low-order compensators. In an alternate embodiment, the interleaver/deinterleaver of FIG. 7b can include low-order compensators as described above with respect to FIG. 7a.

Figure 8A:
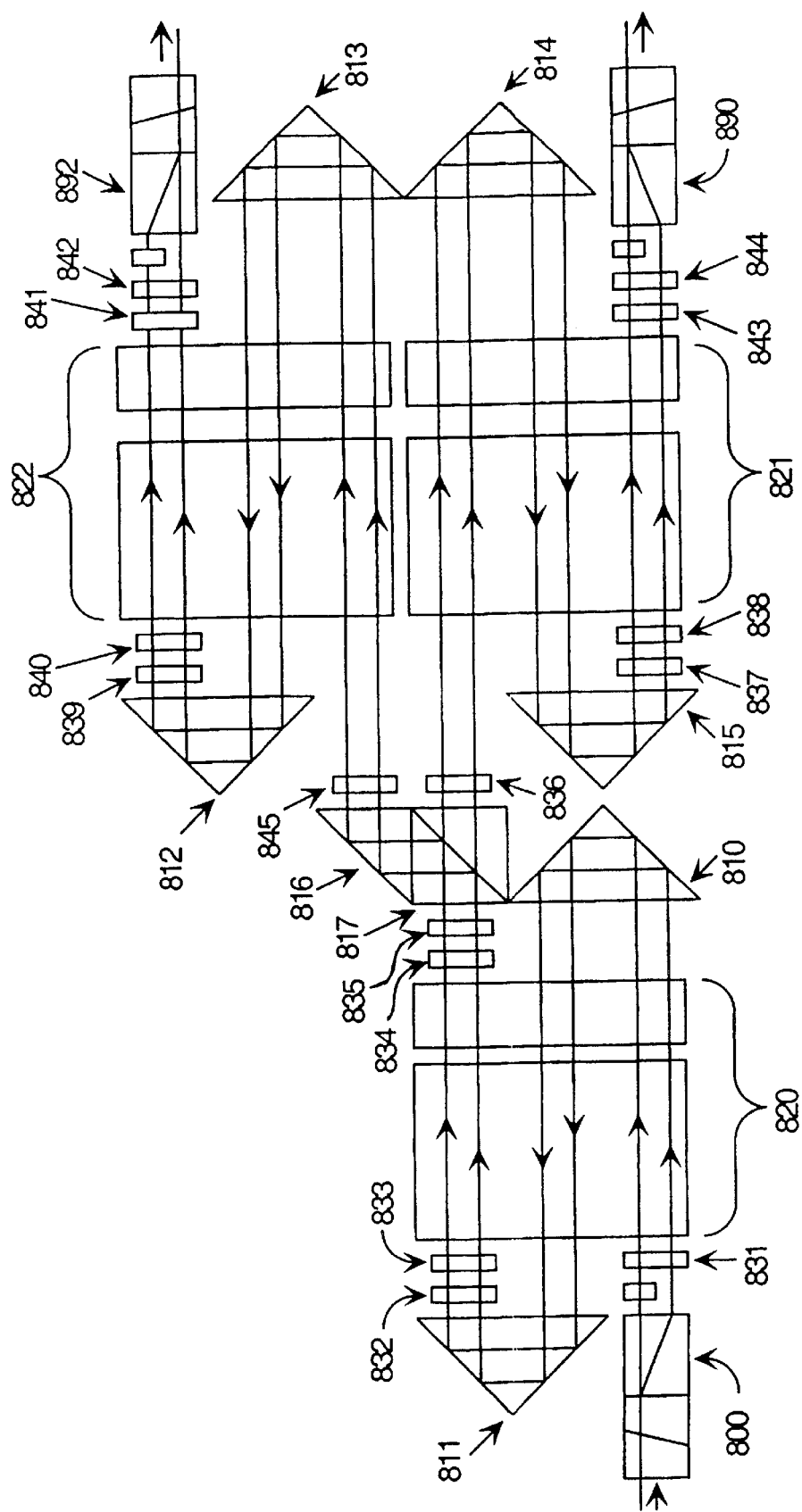
FIG. 8a illustrates one embodiment of a cascaded folded interleavel/deinterleaver having input and output ports on opposite sides of the device.

FIG. 8a illustrates one embodiment of a cascaded folded interleaver/deinterleaver having input and output ports on opposite sides of the device. The interleaver/deinterleaver of FIG. 8a is one embodiment of the block diagram of FIGS. 2 and 3. The arrows of FIG. 8a corresponds to the deinterleaver of FIG. 2. To implement the interleaver of FIG. 3, optical signals can be passed in the opposite direction of the arrows in FIG. 8a.

The interleaver/deinterleaver of FIG. 8a includes three birefringent assemblies (820, 821 and 822). Optical signals that are received via port 800 are directed through birefringent assemblies 820, 821 and 822 to ports 890 and 892. Because the optical signals are not reflected back through birefringent assemblies 820, 821 and 822, the interleaver/deinterleaver of FIG. 8a is a single-pass interleaver/deinterleaver.

An optical signal received via port 800 is directed through half wave plate 831 and birefringent assembly 820, reflected by reflective element 810 back through birefringent assembly 820, reflected by reflective element 811 through half wave plates 832 and 833, birefringent assembly 820 and half wave plates 834 and 835 to beam splitter 817. Beam splitter 817 splits the optical signals by polarization into a first sub-beam and a second sub-beam.

The first sub-beam is passed through half wave plate 836, birefringent assembly 821, reflected by reflective element 814 back through birefringent assembly 821, reflected by reflective element 815 back through half wave plates 837 and 838, birefringent assembly 821 and half wave plates 843 and 844 to port 890. The second sub-beam is reflected by beam splitter 817 to reflective element 816, which directs the second sub-beam to half wave plate 845 to birefringent assembly 822, reflected by reflective element 813 back through birefringent assembly 822 to reflective element 812, which reflects the second sub-beam through half wave plates 839 and 840 to birefringent assembly 822 and half wave plates 841 and 842 to port 892.

In one embodiment, the azimuth angles of the half wave plates of the interleaver/deinterleaver of FIG. 8a are chosen to separate even and odd ITU channels when an optical signal including both even and odd channels is received via port 800. When a set of odd channels is received via port 890 or 892 and a set of even channels is received via port 892 or 890, the sets of channels are combined, or interleaved.

In one embodiment, one or more of birefringent assemblies 820, 821 and 822 is composed of two crystals that are selected to provide thermal stability over a range of operating temperatures. In one embodiment, one crystal is a $TiO_2$ crystal having a thickness of 2 mm, and the second crystal is a $YVO_4$ crystal having a thickness of 9.5 mm; however, other sizes can also be used. Other birefringent assemblies can also be used, for example, a single crystal birefringent assembly. In one embodiment, one or more of birefringent assemblies 820, 821 and 822 is angle tuned as described above.

Figure 8B:
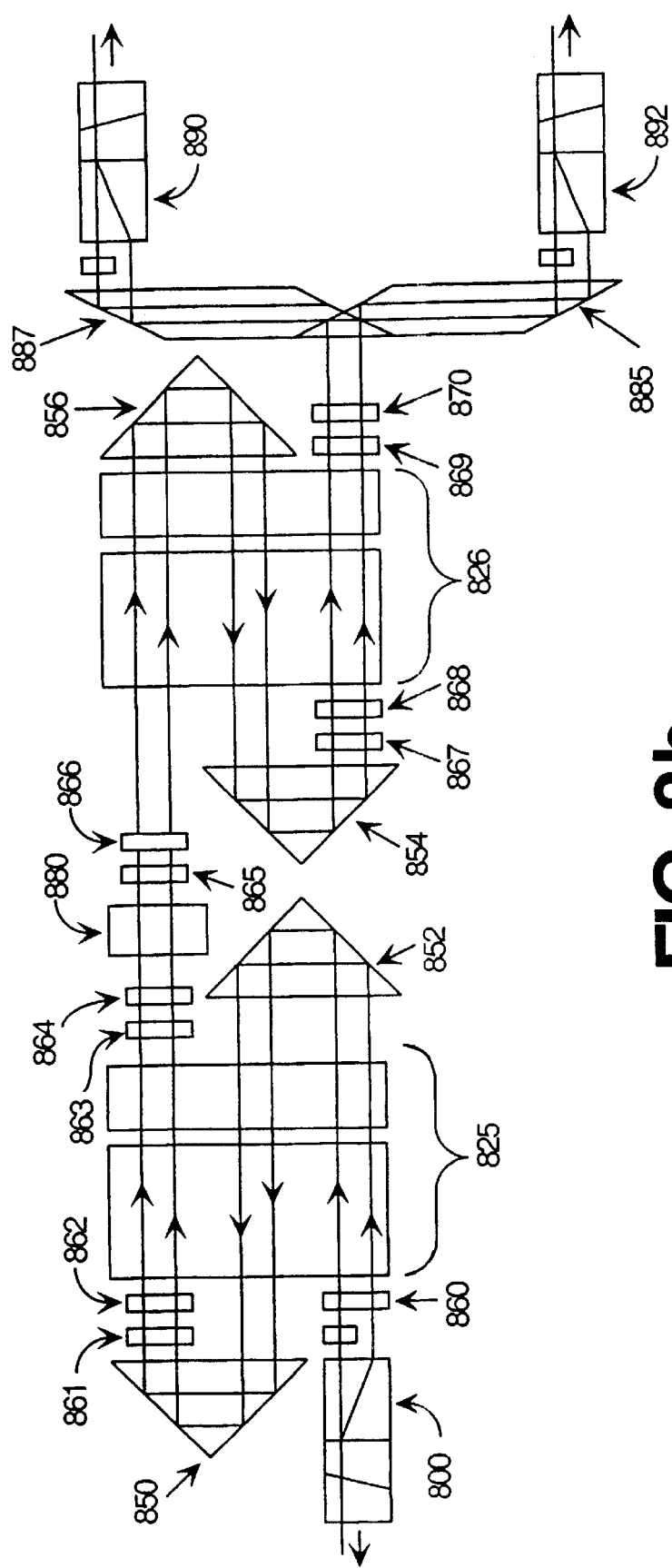
FIG. 8b illustrates one embodiment of a cascaded folded interleaver/deinterleaver having input and output ports on opposite sides of the device.

FIG. 8b illustrates one embodiment of a cascaded folded interleaver/deinterleaver having input and output ports on opposite sides of the device. As with FIG. 8a, the interleaver/deinterleaver of FIG. 8b is one embodiment of the block diagram of FIGS. 2 and 3. The arrows of FIG. 8b corresponds to the deinterleaver of FIG. 2. To implement the interleaver of FIG. 3, optical signals can be passed in the opposite direction of the arrows in FIG. 8b.

The interleaver/deinterleaver of FIG. 8b includes two birefringent assemblies (825 and 826). Optical signals that are received via port 800 are directed through birefringent assemblies 825 and 826 to ports 890 and 892. Because the optical signals are not reflected back through birefringent assemblies 825 and 826, the interleaver/deinterleaver of FIG. 8b is a single-pass interleaver/deinterleaver.

An optical signal received via port 800 passes through half wave plate 860 to birefringent assembly 825 and is reflected by reflective element 852 back through birefringent assembly 825 to reflective element 850, which reflects the optical signal through half wave plates 861 and 862, back through birefringent assembly 825 through half wave plates 863 and 864, walk-off crystal 880, through half wave plates 865 and 866 to birefringent assembly 826, is reflected by reflective element 856 back through birefringent assembly 826 to reflective element 854, which reflects the signal through half wave plate 867 and 868 through birefringent assembly 826 and through half wave plates 869 and 870 to walk-off crystals 885 and 887. Walk-off crystals 885 and 887 direct one set of channels to port 890 and a second set of channels to port 892.

In one embodiment, the azimuth angles of the half wave plates of the interleaver/deinterleaver of FIG. 8b are chosen to separate even and odd ITU channels when an optical signal including both even and odd channels is received via port 800. When a set of odd channels is received via port 890 or 892 and a set of even channels is received via port 892 or 890, the sets of channels are combined, or interleaved.

In one embodiment, one or more of birefringent assemblies 825 and 826 is composed of two crystals that are selected to provide thermal stability over a range of operating temperatures. In one embodiment, one crystal is a $TiO_2$ crystal having a thickness of 2 mm, and the second crystal is a YVO$_4$ crystal having a thickness of 9.5 mm; however, other sizes can also be used. Other birefringent assemblies can also be used, for example, a single crystal birefringent assembly. In one embodiment, one or more of birefringent assemblies 825 and 826 is angle tuned as described above.

The interleaver/deinterleavers of FIGS. 8a and 8b are intended to represent two of the many possible single-pass cascaded interleaver/deinterleavers. Many alternative embodiments having two, three or more birefringent assemblies can be designed to provide a similar function. Thus, the invention as described with respect to cascaded single-pass interleaver/deinterleavers is not intended to be limited to the two embodiments illustrated in FIGS. 8a and 8b.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
   a birefringent assembly; and
   a plurality of reflective elements to reflect an optical signal such that the optical signal follows an optical path that makes multiple passes through the birefringent assembly, wherein a signal received via a first port is separated into a first subset and a second subset directed to a second port and a third port, respectively, and further wherein optical signals received via the second port and the third port are combined and directed to the first port.

2. The apparatus of claim 1 further comprising a plurality of half wave plates positioned between one or more of the reflective elements and the birefringent assembly, the plurality of half wave plates being oriented with azimuth angles such that an optical signal having a set of optical channels received via the first port is separated into a first subset of optical channels and a second set of optical channels and output via the second port and the third port, and that a set of optical channels received via the second port and a set of optical channels received via the third port are combined into a superset of optical channels and output via the first port.

3. The apparatus of claim 2 comprising first beam splitting/combining means for splitting the signal received via the first port into the first and second subsets for output from the second and third ports, respectively, or for combining the first and second subsets into a combined optical signal for passing through the birefringent assembly to the first port.

4. The apparatus of claim 3 further comprising:
   second beam splitting/combining means for splitting incoming signals received via the first, second and third ports into pairs of orthogonally polarized components, and for combining pairs of orthogonally polarized components for output via the first, second and third ports; and
   polarization rotating means for changing the polarization of one of each pair of the components, whereby both components have parallel polarizations.

5. The apparatus of claim 4 wherein for deinterleaving, a first pair of components of the signal received via the first port are directed through the birefringent assembly to a first reflecting element, which directs the first pair of components through the birefringent assembly a third time to the first beam splitter/combiner means; and
   wherein for interleaving, a second pair of components received via the first splitter/combiner means are directed through the birefringent assembly to the second reflecting element, which directs the second pair of components through the birefringent assembly a second time to the first reflecting element, which directs the second pair of components through the birefringent assembly a third time to the first port.

6. The apparatus of claim 5, further comprising a third reflecting element and a fourth reflecting element receiving the first pair of components from the second reflecting element for directing the first pair of components through the birefringent assembly a fourth and fifth time to the first beam splitter/combining means, or receiving the second pair of components from the first beam splitter/combining means for directing the second pair of components through the birefringent assembly twice to the second reflecting element.

7. The apparatus of claim 4 wherein a first wave-rotating means is positioned between the first port and the birefringent assembly for adjusting the polarization of the signals entering therein in accordance with the alignment of the birefringent assembly; wherein a second wave-rotating means is positioned between the second and third ports and the birefringent assembly for adjusting the polarization of the signals enter therein accordance with the alignment of the birefringent assembly; and wherein a third wave-rotating means is positioned to adjust the polarization of the signals between a first and a second pass through the birefringent assembly between the second and third pass through the birefringent assembly in accordance with the alignment of the birefringent assembly.

8. The apparatus of claim 1 wherein the birefringent assembly comprises multiple crystals.

9. The apparatus of claim 8 wherein the birefringent assembly comprises a TiO$_2$, crystal and a YVO$_4$ crystal.

10. The apparatus of claim 1 wherein the birefringent assembly comprises a single birefringent crystal.

11. The apparatus of claim 1 wherein the signal received via the first port or the signals received via the second and third ports comprise wavelength division multiplexed (WDM) optical signals of International Telecommunications Union (ITU) channels.

12. The apparatus of claim 1 further comprising a switching component to selectively switch signals between the second port and the third port.

13. The apparatus of claim 1 wherein the reflective elements each further comprise a low-order compensator component to compensate for phase shift in the respective reflective elements.

14. The apparatus of claim 1 wherein the reflective elements comprise 90° reflective crystals.

15. The apparatus of claim 1 further comprising a polarization beam splitter to direct the first subset of optical signals to the second port and the second subset of signals to the third port.

16. An interleaver/deinterleaver apparatus comprising:
   a first port for inputting or outputting a combined optical signal comprising first and second polarized optical signals;
   a second port for outputting or inputting the first signal;
   a third port for outputting or inputting the second signal;
   a birefringent assembly, optically coupled to the first, second and third ports, providing the first signal within the combined signal with a different polarization than the second signal;

means for reflecting the combined optical signal or the first and second signals such that each optical signal makes at least three passes through the birefringent assembly along parallel paths, thereby providing optical filtering; and beam splitting/combining means for splitting the combined optical signal into the first and second signals or for combining the first and second signals into the combined optical signal;

wherein the combined optical signal, received via the first port, is separated into the first signal and the second signal, and directed to the second port and the third port, respectively; and wherein the first and second optical signals received via the second port and the third port, respectively; and wherein the first and second optical signals received via the second port and the third port are combined and directed to the first port.

17. The apparatus of claim 16 further comprising beam rotating means for introducing a phase difference in the optical signals positioned between one or more of the reflecting means and the birefringent assembly; wherein the beam rotating means are positioned to intersect the optical signals between a first and a second pass through the birefringent assembly or between the second and a third pass therethrough, and are oriented with azimuth angles such that an optical signal having a set of optical channels received via the first port is separated into a first subset of optical channels and a second set of optical channels and output via the second port and the third port, and that a set of optical channels received via the second port and a set of optical channels received via the third port are combined into a superset of optical channels and output via the first port.

18. The apparatus of claim 16 wherein the birefringent assembly comprises at least two elements, at least two of the elements comprised of different materials to enhance thermal stability.

19. The apparatus of claim 18 wherein the birefringent assembly comprises a $TiO_2$ crystal and a $YVO_4$ crystal.

20. The apparatus of claim 16 wherein the birefringent assembly comprises a single birefringent crystal.

21. The apparatus of claim 16 wherein the signal received via the first port or the signals received via the second and third ports comprise wavelength division multiplexed (WDM) optical signals of International Telecommunications Union (ITU) channels.

22. The apparatus of claim 16 further comprising a switching component to selectively switch the first and the second signals during output between the second port and the third port.

23. The apparatus of claim 16 wherein the beam splitting/combining means is positioned between the birefringent assembly and the second and third ports to direct the first signal to the second port and the second signal to the third port or to combine the first and second signals into the combined signals and direct the combined signal to the birefringent assembly.

24. An apparatus comprising:

a plurality of birefringent assemblies; and a plurality of reflective elements to reflect an optical signal such that the optical signal follows an optical path that makes multiple passes through each of the birefringent assemblies, wherein a signal received via a first port is separated into a first subset and a second subset directed to a second port and a third port, respectively, and further wherein optical signals received via the second port and the third port are combined and directed to the first port.

25. The apparatus of claim 24 further comprising a plurality of half wave plates positioned between one or more of the reflective elements and the birefringent assemblies, the plurality of half wave plates being oriented with azimuth angles such that an optical signal having a set of optical channels received via the first port is separated into a first subset of optical channels and a second set of optical channels and output via the second port and the third port, and that a set of optical channels received via the second port and a set of optical channels received via the third port are combined into a superset of optical channels and output via the first port.

26. The apparatus of claim 24 wherein at least one of the birefringent assemblies comprises multiple crystals.

27. The apparatus of claim 26 wherein at least one of the birefringent assemblies comprises a $TiO_2$, crystal and a $YVO_4$ crystal.

28. The apparatus of claim 24 wherein at least one of the birefringent assemblies comprises a single birefringent crystal.

29. The apparatus of claim 24 wherein the optical received via the first or the second and third ports comprise wavelength division multiplexed (WDM) optical signals of International Telecommunications Union (ITU) channels.

* * * * *